(12) United States Patent
Abe et al.

(10) Patent No.: US 7,233,551 B2
(45) Date of Patent: Jun. 19, 2007

(54) OPTICAL DISK CONTROL DEVICE FOR TIME-DIVISION-MULTIPLEXING AND A/D CONVERSION

(75) Inventors: Masayoshi Abe, Daito (JP); Kouju Konno, Takatuki (JP); Teruhiko Izumi, Otsu (JP); Yasuhiro Tai, Kadoma (JP)

(73) Assignee: Matsushita Electric Industrial Co., Ltd., Kadoma-shi (JP)

( * ) Notice: Subject to any disclaimer, the term of this patent is extended or adjusted under 35 U.S.C. 154(b) by 570 days.

(21) Appl. No.: 10/025,998

(22) Filed: Dec. 26, 2001

(65) Prior Publication Data

US 2002/0080707 A1    Jun. 27, 2002

(30) Foreign Application Priority Data

Dec. 22, 2000    (JP)    ............................. 2000-390339

(51) Int. Cl.
  G11B 7/04    (2006.01)
(52) U.S. Cl. ................. 369/47.2; 369/59.27; 369/47.35
(58) Field of Classification Search ............. 369/59.27
  See application file for complete search history.

(56) References Cited

U.S. PATENT DOCUMENTS

| | | | |
|---|---|---|---|
| 4,287,802 A * | 9/1981 | Imamura et al. ............... 84/617 |
| 4,795,958 A | 1/1989 | Nakamura et al. ........... 318/625 |
| 5,606,536 A | 2/1997 | Watanabe et al. ......... 369/44.36 |
| 5,627,805 A * | 5/1997 | Finkelstein et al. ....... 369/30.23 |
| 6,016,294 A * | 1/2000 | Horigome ................ 369/44.36 |
| 6,111,831 A | 8/2000 | Alon et al. |
| 6,483,787 B1 | 11/2002 | Sugasawa et al. ........ 369/44.13 |

FOREIGN PATENT DOCUMENTS

| | | | |
|---|---|---|---|
| JP | 63-78374 | | 4/1988 |
| JP | 6-236556 | | 8/1994 |
| JP | 06236556 A | * | 8/1994 |
| JP | 8-36761 | | 2/1996 |
| JP | 11-238245 | | 8/1999 |

* cited by examiner

*Primary Examiner*—Brian E. Miller
*Assistant Examiner*—Michael V. Battaglia
(74) *Attorney, Agent, or Firm*—Steptoe & Johnson LLP

(57) ABSTRACT

An optical disk control device comprises a playback signal detection unit for detecting data recorded on a disk by irradiating the disk with a converged light beam; a signal switching unit for successively selecting plural data signals obtained by the playback signal detection unit, and performing time-division-multiplexing on the selected signals; an A/D conversion unit for converting an analog signal which has been time-division-multiplexed by the signal switching unit, into a digital signal; an A/D conversion command unit for generating an A/D conversion command of the A/D conversion unit; a serial transfer unit for serial-transferring the command signal generated by the A/D conversion command unit; a serial reception unit for receiving the signal from the serial transfer unit, and controlling the signal selection operation of the signal switching unit on the basis of the received signal; and an arithmetic unit for generating an optical disk drive controlling signal by performing arithmetic processing on the digital signal outputted from the A/D control unit. Therefore, the number of signal lines required for connection between the playback signal detection unit and the A/D conversion unit can be significantly reduced.

9 Claims, 13 Drawing Sheets

- convergence lens 103
- light beam 106
- distribution of light quantity
- photodetector 113 track center

OPTICAL DISK CONTROL DEVICE FOR TIME-DIVISION-MULTIPLEXING AND A/D CONVERSION

FIELD OF THE INVENTION

The present invention relates to an optical disk control device and, more particularly, to an improved digital control device employed in an optical disk drive which records or reproduces data on/from a disk on which tracks are formed.

BACKGROUND OF THE INVENTION

Conventionally, there is an optical disk drive which irradiates an optical disk rotating at a predetermined rpm with a light beam emitted from a light source such as a semiconductor laser or the like to reproduce a signal recorded on the optical disk. Hereinafter, an optical disk drive according to a first prior art will be described with reference to FIGS. 8 and 9.

In FIG. 8, a disk 100 is fixed to a rotation axis 102 of a motor 101, and rotates at a predetermined rpm.

The disk 100 has spiral tracks on which pits and projections are formed, and data are recorded on the tracks, i.e., the pits and projections. The track pitch is 0.74 micrometer (hereinafter referred to as "μm"), and the width of each pit and projection is about 0.6 μm.

A laser 109 as a light source, a coupling lens 108, a polarization beam splitter 110, a ¼ wavelength plate 107, a total reflection mirror 105, a photodetector 113, a detection lens 111, a cylindrical lens 112, and an actuator 104 are fixed onto a carrier 115 of an optical pickup, and the carrier 115 is driven by a motor 114 in the direction of the radius of the disk 100.

A laser driving circuit 175 drives the laser 109 according to a command from a DSP 140. The laser 109 is fixed onto the carrier 115. A light beam 106 emitted from the laser 109 is converted into a parallel light beam by the coupling lens 108, travels through the polarization beam splitter 110 and the ¼ wavelength plate 107, is reflected at the total reflection mirror 105, and is focused on an information surface of the disk 100 by a convergence lens 103.

The light beam reflected at the information surface of the disk 100 travels through the convergence lens 103, and is reflected at the total reflection mirror 105. The reflected light beam travels through the ¼ wavelength plate 107, the polarization beam splitter 110, the detection lens 111, and the cylindrical lens 112, and enters into the photodetector 113 comprising four photoreceptive parts.

The convergence lens 103 is fixed to a movable part of the actuator 104. The actuator 104 is composed of a focusing coil, a tracking coil, a focusing permanent magnet, and a tracking permanent magnet.

When a voltage is applied to the focusing coil (not shown) of the actuator 104 by using a power amplifier 152, a current flows in the coil, and the coil receives a magnetic power from the focusing permanent magnet (not shown), whereby the convergence lens 103 moves in the direction perpendicular to the information surface of the disk 100 (vertical direction in FIG. 8). The convergence lens 103 is controlled so that the focal point of the light beam 106 is always positioned (focused) on the information surface of the disk 100, on the basis of a focusing error signal indicating a deviation of the focal point of the light beam from the information surface of the disk.

Further, when a voltage is applied to the tracking coil (not shown) using a power amplifier 145, a current flows in the coil, and the coil receives a magnetic power from the tracking permanent magnet (not shown), whereby the convergence lens 103 moves in the direction of the radius of the disk 100, i.e., across the tracks on the disk 100 (horizontal direction in FIG. 8).

The photodetector 113 is composed of four photoreceptive elements. The reflected light beam from the disk is incident on the photodetector 113. In the photodetector 113, the incident light beam is converted into currents by the four photoreceptive elements, and the currents are sent to I/V converters 116, 117, 118, and 119. Each of the I/V converters 116, 117, 118, and 119 converts the inputted current into a voltage according to the current level.

Each of adders 120, 121, 123, 124, and 130 performs addition of input signals, and outputs the sum. Each of subtracters (hereinafter also referred to as differential circuits) 122 and 125 performs subtraction of input signals, and outputs the difference.

To be specific, the adder 124 adds the outputs of the I/V converters 116 and 117, the adder 123 adds the outputs of the I/V converters 118 and 119, the adder 120 adds the outputs of the I/V converters 116 and 119, the adder 121 adds the outputs of the I/V converters 117 and 118, and the adder 130 adds the outputs of the adders 124 and 123. The subtracter 125 subtracts the output of the adder 123 from the output of the adder 124. The subtracter 122 subtracts the output of the adder 121 from the output of the adder 120.

The output from the subtracter 122 is a focusing error signal which indicates a deviation of the focal point of the light beam applied to the disk, from the information surface of the disk 100. The focusing error signal is transferred to an analog-to-digital converter (hereinafter referred to as an A/D converter) 149, and processed through a phase compensation circuit 150, a digital-to-analog converter (hereinafter referred to as an D/A converter) 151, and a power amplifier 152, whereby a current flows in the focusing coil of the actuator 104.

The A/D converter 149 converts an analog signal into a digital signal. Further, the D/A converter 151 converts a digital signal into an analog signal.

The phase compensation circuit 150 is a digital filter, and performs phase compensation on the focusing servo system to stabilize the servo loop. In this way, the convergence lens 103 is driven according to the focusing error signal, and the focal point of the light beam is always positioned (focused) on the information surface of the disk.

The optical system shown in FIG. 8 constitutes a method of detecting a tracking error signal (hereinafter referred to as a TE signal), which is generally called a push-pull method. Accordingly, the output from the subtracter 125 becomes a TE signal which indicates a deviation of a spot of the light beam applied to the optical disk from a track on the disk 100. Hereinafter, the output from the subtracter 125 is referred to as a first TE signal. The first TE signal is transferred to a switch 155, and processed through an A/D converter 143, an adder 142, a phase compensation circuit 144, a D/A converter 170, and the power amplifier 145, whereby a current flows in the tracking coil of the actuator 104.

The phase compensation circuit 144 is a digital filter, and performs phase compensation on the tracking servo system to stabilize the servo loop. Accordingly, the convergence lens 103 is driven according to the first TE signal, whereby the spot of the light beam always follows the tracks.

Further, the TE signal is transferred to a power amplifier 129 through a low-pass filter 146, a D/A converter 147, and an adder 148. Since the carrier motor 114 is driven by the power amplifier 129, the carrier motor 114 is controlled according to the low-frequency component of the TE signal. That is, in the tracking servo system, tracking is carried out by the actuator 104 for a response of high frequency, and tracking is carried out by the carrier motor 114 for a response of low frequency.

Next, the adder 130 adds the outputs of the adders 123 and 124. That is, the output from the adder 130 is the total amount of light received by the photodetector 113. Hereinafter, the output signal from the adder 130 is referred to as a total reflected light amount signal. The output from the adder 130 is transferred to an address reproduction circuit 131. The address reproduction circuit 131 reproduces a sector address, and sends it to a digital signal processor (hereinafter referred to as a DSP) 140. Further, the address reproduction circuit 131 outputs a signal synchronized with the address to a gate generation circuit 132.

The gate generation circuit 132 outputs, to a switch 133, a gate signal which becomes high level in VFO1 and VFO2 areas of the address section. Hereinafter, signals in the VFO1 area and the VFO2 area are referred to as a VFO1 signal and a VFO2 signal, respectively. Further, as shown in FIG. 9, the gate generation circuit 132 generates a sampling signal for sampling and holding the VFO1 signal and the VFO2 signal which are extracted by the gate signal that becomes high in the VFO1 and VFO2 areas of the address section, respectively. The sampling signal generated in the gate generation circuit 132 is outputted toward a sample hold circuit (hereinafter referred to as an S/H circuit) 136 for sampling the VFO1 signal in the address section, and it is also outputted toward an S/H circuit 137 for sampling the VFO2 signal in the address section.

The switch 133, an HPF 172, a full wave rectifier 134, an LPF 135, S/H circuits 136 and 137, and a subtracter 138 constitute a circuit for detecting a second TE signal. The output from the subtracter 138 is the second TE signal.

The second TE signal is transferred through a switch 153, converted into a digital signal in an A/D converter 152, and transferred to the adder 142.

Next, the operation of the DSP 140 when the tracking servo is operated will be described.

In the initial state, the DSP 140 closes the switch 155 while the switch 153 is open, thereby operating the tracking servo. Therefore, the convergence lens 104 is driven on the basis of the first TE signal.

The address reproduction circuit 131 reads an address at a position irradiated with a beam spot, on the basis of the output from the adder 130, i.e., the total reflected light amount signal, and sends an address signal to the DSP 140. The DSP 140 identifies a zone on the optical disk on the basis of the address. Then, the DSP 140 sends a command to a motor control circuit 171 so that the rpm of the disk 100 reaches an rpm according to the zone. When the rpm of the disk 100 reaches the predetermined rpm, the address reproduction circuit 131 sends a signal synchronized with the address, to the gate generation circuit 132.

The gate generation circuit 132 generates an address signal, a VFO1 signal, and a VFO2 signal, and outputs these signals as control signals to the switch 133, the sample hold circuit 136, and the sample hold circuit 137, whereby a second TE generation circuit 200 outputs a second TE signal from the output of the subtracter 138.

Next, the DSP 140 corrects the target position of the tracking servo system which is operating on the basis of the first TE signal. That is, in the adder 142, the second TE signal is added to the tracking servo system based on the first TE signal, thereby adding an offset to the tracking servo system. Since plural tracks are formed in a spiral on the disk, and the track pitch is 0.74 µm. A recording film comprising a phase changing material or the like is formed on the information surface of the disk. When recording data on the disk, the reflectivity of the recording film is changed by changing the intensity of the light beam according to the data while performing tracking servo so that the light beam is always focused on the track. When reproducing data from the disk, the reflected light beam from the optical disk is received by the photodetector while performing tracking servo so that the light beam is always focused on the track, and the output from the photodetector is processed to reproduce the data.

The amount of deviation of the light beam from the track, which is required for tracking servo, is also detected from the reflected light from the disk. Hereinafter, a description will be given of a tracking error detection method which is generally called a push-pull method.

The push-pull method is also called a far field method. In this method, a light beam which is reflected and diffracted at a guide groove on the disk is applied to two photoreceptive elements of a two-part photodetector, which are arranged symmetrically with respect to the center of track, and a difference of the outputs from the photoreceptive elements is taken out as a TE signal. As shown in FIG. 10($b$), when the spot of the light beam is aligned with the center of the projection or pit of the groove, a symmetrical distribution of reflected and diffracted light is obtained. However, in other cases (FIGS. 10($a$) and 10($c$)), the light intensity becomes asymmetrical. FIG. 11 shows a difference in outputs from the two-part photodetector when the spot of the light beam travels across the tracks. The TE signal becomes 0 in the center of the pit or projection. Tracking servo is carried out as follows. The tracking actuator is driven through the phase compensation circuit and the driving circuit according to the TE signal, and the spot on the disk is driven in the direction perpendicular to the tracks to follow the target track.

Next, a description will be given of an optical disk drive according to a second prior art, with reference to FIG. 12.

Since the fundamental control operations such as focusing servo and tracking servo are identical to those described for the first prior art, repeated description is not necessary.

A digital control circuit for an optical disk drive is divided into an analog signal processing integrated circuit and a digital signal processing integrated circuit in many cases. Hereinafter, an integrated circuit is referred to as an IC.

In FIG. 12, IC1 denotes an analog signal processing IC, and IC3 denotes a digital signal processing IC.

The analog signal processing IC IC1 is supplied with signals, which are obtained by I/V converting the light beam reflected at the disk and incident on the photodetector 113, by the I/V converters 116, 117, 118, and 119.

Each of adders 120, 121, 123, 124, and 130 performs addition of input signals, and outputs the sum. Each of subtracters (differential circuits) 122, 125, and 126 performs subtraction of input signals, and outputs the difference.

The output from the subtracter 122 is outputted from the analog signal processing IC IC1 as a focusing error signal which indicates a deviation of the focal point of the light beam applied to the disk, from the information surface of the disk. Further, the output from the subtracter 125 is a first TE signal based on the push-pull method for making the spot on the disk follow the target track. The first TE signal based on the push-pull method is inputted to a switch 154, together with a TE signal based on the phase difference method, which is generated by a phase difference detection circuit 160. The switch 154 selects either the first TE signal based on the push-pull method or the TE signal based on the phase difference method, and outputs the selected signal as an output of the analog signal processing IC.

The total reflected light amount signal outputted from the adder 130 is supplied to a tilt detection circuit 161, a second TE generation circuit 162, and an RF amplitude detection circuit 163 in the analog signal processing IC IC1, and further, it bypasses the analog signal processing IC IC1 to be supplied to the digital signal processing IC IC3.

The tilt detection circuit 161 detects an angle formed between the disk and the light beam applied to the disk, and outputs the result of the detection to the digital signal processing IC IC3. The second TE signal generation circuit 162 corrects the target value of the first TE signal as described above, and outputs the result of the correction to the digital signal processing IC IC3. The RF amplitude detection circuit 163 detects the amplitude of a reproduced RF signal obtained from the total reflected light amount. The RF amplitude detection circuit 163 is used for detection as to whether a recording area on the disk has already been recorded or not, and detection of the RF signal amplitude. A switch 165 selects either the output from the RF amplitude detection circuit 163 or a wobble amplitude signal outputted from a wobble signal detection circuit 164, and outputs the selected signal to the digital signal processing IC IC3.

A wobble signal appears in the TE signal when the tracking servo follows a single track, because the tracks (pits and projections) formed on the disk wind at a high frequency. Since the wobble signal has a frequency ten times or more as high as the band frequency required for tracking servo, a broad-band subtracter is needed, and the subtracter 126 corresponds to the broad-band subtracter. In order to detect the amplitude of the wobble signal, the wobble signal which is included in the broad-band TE signal outputted from the subtracter 126 is inputted to the wobble signal detection circuit 164.

Further, the actuator (104 in FIG. 8) is provided with a position detector in the tracking direction. This position detector is used for suppressing a vibration of the actuator in the tracking direction when only the carrier is moved with the tracking servo being turned off, during search for the target track. A signal outputted from the position detector is amplified in a position detection circuit 166 and, further, it is differentiated in the position detection circuit 166. A switch 167 selects either the amplified signal or the differentiated signal, and outputs the selected signal to the digital signal processing IC IC3.

On the other hand, in the digital signal processing IC IC3, all of the output signals from the analog signal processing IC IC1 are inputted to a switch 168. The switch 168 successively selects the output signals according to A/D conversion commands from the DSP 140, and the selected signals are converted into digital signals by an A/D converter 169. The respective signals captured as digital signals are subjected to processing such as phase compensation by the DSP 140, and converted into analog signals by D/A converters 151, 170, and 147. These analog signals drive the actuator or the like through a power amplifier (not shown).

By the way, optical disk drives in recent years are constructed such that a single drive can deal with plural kinds of disks. For example, a DVD-RAM/ROM disk recording/playback device is adaptable to DVD-R recording, a DVD-ROM disk playback device is adaptable to CD-R/RW recording, and so on. In this case, an IC adapted to a disk to be newly handled is added to an IC adapted to a fundamental disk.

Hereinafter, an optical disk drive according to a third prior art, which is adaptable to plural kinds of disks, will be described with reference to FIG. 13.

Since the fundamental servo operations such as focusing servo and tracking servo are identical to those described for the first prior art, repeated description is not necessary.

In FIG. 13, IC1 is an analog signal processing IC adaptable to a fundamental disk such as a DVD-RAM/ROM or the like, IC2 is an analog signal processing IC which is added to deal with a new disk such as a DVD-R or the like, and IC3 is a digital signal processing IC adaptable to both of the fundamental disk and the new disk.

In this third prior art, as in the second prior art, the reflected signal from the disk, which is supplied from the photoreceptive element, is processed by a processing circuit 180, whereby various kinds of signals are outputted. Likewise, the reflected signal is supplied from a photoreceptive element which is provided for the new disk, and processed by a processing circuit 181, whereby various kinds of signals are outputted. The digital signal processing IC IC2 selects, by a switch 156, either the signals outputted from the analog signal processing IC IC1 or the signals outputted from the analog signal processing IC IC2 by using the switch 156, thereby deciding, for each disk to deal with, that the disk should be controlling by the outputs from the analog signal processing IC IC1 or the outputs from the analog signal processing IC IC2.

As described above, when a single optical disk drive is adapted to plural kinds of disks, the circuit components are increased, and the number of signal lines connecting the respective ICs is increased, whereby the number of pins of each IC is increased, resulting in disadvantages in cost and reliability.

As described above, since the recent optical disk drive is required to deal with plural kinds of disks, the circuit components are increased, and usually, an IC adapted to an additional disk is added to a fundamental IC structure. Accordingly, the number of connection lines tends to increase over the existing connection lines, and the above-mentioned problems are not fundamentally resolved unless the individual ICs corresponding to the respective disks are integrated into one.

Furthermore, when an additional IC structure is added to the fundamental IC structure, the number of connection lines between the ICs is increased, whereby the number of pins of each IC is increased, resulting in disadvantages in cost and reliability.

SUMMARY OF THE INVENTION

The present invention is made to solve the above-described problems and has for its object to provide a digital-servo-system optical disk control device which can constitute an optical disk drive with an IC structure that is superior to the conventional disk drive in cost and reliability without increasing the number of connection lines between ICs, even when the fundamental structure is developed in the functions so as to be adaptable to plural kinds of disks.

Other objects and advantages of the invention will become apparent from the detailed description that follows. The detailed description and specific embodiments described are provided only for illustration since various additions and modifications within the scope of the invention will be apparent to those of skill in the art from the detailed description.

According to a first aspect of the present invention, an optical disk control device comprises: a playback signal detection means for detecting data recorded on a disk by irradiating the disk with a converged light beam; a signal switching means for successively selecting plural data signals obtained by the playback signal detection means, and performing time-division-multiplexing on the selected signals; an A/D conversion means for converting an analog signal which has been time-division-multiplexed by the signal switching means, into a digital signal; an A/D conversion command means for generating an A/D conversion command of the A/D conversion means; a serial transfer means for serial-transferring the command signal generated by the A/D conversion command means; a serial reception means for receiving the signal from the serial transfer means, and controlling the signal selection operation of the signal switching means on the basis of the received signal; and an arithmetic means for generating an optical disk drive controlling signal by performing arithmetic processing on the digital signal outputted from the A/D control means. Therefore, the number of signal lines required for connection between the playback signal detection means and the A/D conversion means can be significantly reduced.

According to a second aspect of the present invention, the optical disk control device according to the first aspect comprises: an analog signal processing means including the playback signal detection means, the signal switching means, and the serial reception means; and a digital signal processing means including the A/D conversion means, the A/D conversion command means, and the serial transfer means. Therefore, the number of signal lines required for connection between the analog signal processing means and the digital signal processing means can be significantly reduced.

According to a third aspect of the present invention, in the optical disk control device according to the second aspect, a plurality of the analog signal processing means are provided; and the A/D conversion means successively selects, in a predetermined order, the output signals from the signal switching means in the plural analog signal processing means, and successively converting the selected signals into digital signals. Therefore, when a plurality of analog signal processing means are provided to deal with different kinds of disks, the number of signal lines required for connection between the plural analog signal processing means and the digital signal processing means can be significantly reduced.

According to a fourth aspect of the present invention, in the optical disk control device according to the second aspect, the analog signal processing means further includes a sample hold means for sampling and holding the output signal from the signal switching means, on the basis of the signal transferred from the serial transfer means; and the A/D conversion means converts the analog signal which is sampled and held by the sample hold means, into a digital signal, instead of the output signal from the signal switching means. Therefore, the signal which has been time-division-multiplexed by the signal switching means can be subjected to parallel processing such as gain adjustment or the like.

According to a fifth aspect of the present invention, in the optical disk control device according to the third aspect, each of the plural analog signal processing means further includes a sample hold means for sampling and holding the output signal from the signal switching means, on the basis of the signal transferred from the serial transfer means; and the A/D conversion means converts the analog signal which is sampled and held by the sample hold means, into a digital signal, instead of the output signal from the signal switching means. Therefore, the signal which has been time-division-multiplexed by the signal switching means can be subjected to parallel processing for gain adjustment or the like.

According to a sixth aspect of the present invention, in the optical disk control device according to the fourth aspect, the analog signal processing means includes a pair of the signal switching means, and a pair of the sample hold means. Therefore, among the signals outputted from the analog signal processing means, paired signals can be transferred, as they are, to the digital signal processing means. Accordingly, when a process for obtaining a difference between paired signals or the like is to be performed, this process can be executed in the digital signal processing means, whereby the circuit scale of the analog signal processing means can be reduced.

According to a seventh aspect of the present invention, in the optical disk control device according to the fourth aspect, each of the plural analog signal processing means includes a pair of the signal switching means, and a pair of the sample hold means. Therefore, among the signals outputted from the analog signal processing means, paired signals can be transferred, as they are, to the digital signal processing means. Accordingly, when a process for obtaining a difference between paired signals or the like is to be performed, this process can be executed in the digital signal processing means, whereby the circuit scale of the analog signal processing means can be reduced.

According to an eighth aspect of the present invention, in the optical disk control device according to the first or second aspect, the serial transfer means is controlled on the basis of the conversion command from the A/D conversion command means; and the output signal from the playback signal detection means is transferred to the A/D conversion means, for every conversion command, according to the signal from the serial reception means. Therefore, the control signal for controlling transfer of the output signals from the playback signal detection means is also transferred as a serial signal, whereby the number of signal lines can be significantly reduced with regard to, not only the transfer of the original signals, but also the transfer of the transfer control signal.

According to a ninth aspect of the present invention, in the optical disk control device according to the first or second aspect, the conversion command from the A/D conversion command means, which is obtained from the serial reception means, includes a selection signal; and the signal switching means is operated on the basis of the selection signal, and the time-division-multiplexed signal is transferred to the AD conversion means for every A/D conversion command. Therefore, the control signal for controlling signal selection of the signal switching means is also transferred as a serial signal, whereby the number of signal lines can be significantly reduced with regard to, not only the transfer of the original signals, but also the transfer of the switching control signal.

According to a tenth aspect of the present invention, in the optical disk control device according to the first or second aspect, the serial transfer means and the serial reception means perform state-setting communication for setting the internal state of the optical disk control device, in addition to communication for the conversion command from the A/D conversion command means; and discrimination between these communications is performed according to identifying signals or bit lengths. Since not only the communication for conversion command but also the communication for state setting are carried out with serial signals, it is not necessary to provide signal lines concerning the communication for state setting apart from the transfer of conversion commands. Therefore, the number of signal lines can be significantly reduced with regard to, not only the transfer of the original signals, but also the transfer of the switching control signal.

According to an eleventh aspect of the present invention, in the optical disk control device according to the fourth aspect, the analog signal processing means further includes a variable gain amplification means for amplifying the output signal from the sample hold means; the A/D conversion means converts the analog signal which is amplified by the variable gain amplification means, into a digital signal, instead of the output signal from the sample hold means; and the gain of the variable gain amplification means is set by a state-setting signal which is transferred by state-setting communication for setting the internal state of the optical disk control device. Therefore, the signal which has been time-division-multiplexed by the signal switching means can be subjected to gain adjustment before it is outputted.

According to a twelfth aspect of the present invention, in the optical disk control device according to the fifth aspect, each of the plural analog signal processing means further includes a variable gain amplification means for amplifying the output signal from the sample hold means; the A/D conversion means converts the analog signal which is amplified by the variable gain amplification means, into a digital signal, instead of the output signal from the sample hold means; and the gain of the variable gain amplification means is set by a state-setting signal which is transferred by state-setting communication for setting the internal state of the optical disk control device. Therefore, the signal which has been time-division-multiplexed by the signal switching means can be subjected to gain adjustment before it is outputted.

According to a thirteenth aspect of the present invention, in the optical disk control device according to the eleventh aspect, the analog signal processing means includes a pair of the sample hold means, and a pair of the variable gain amplification means. Therefore, when paired signals are time-division-multiplexed by the signal switching means, one of the paired signals can be subjected to gain adjustment before it is outputted.

According to a fourteenth aspect of the present invention, in the optical disk control device according to the twelfth aspect, each of the plural analog signal processing means includes a pair of the sample hold means, and a pair of the variable gain amplification means. Therefore, when paired signals are time-division-multiplexed by the signal switching means, one of the paired signals can be subjected to gain adjustment before it is outputted.

DETAILED DESCRIPTION OF THE PREFERRED EMBODIMENTS

[Embodiment 1]

Figure 1:
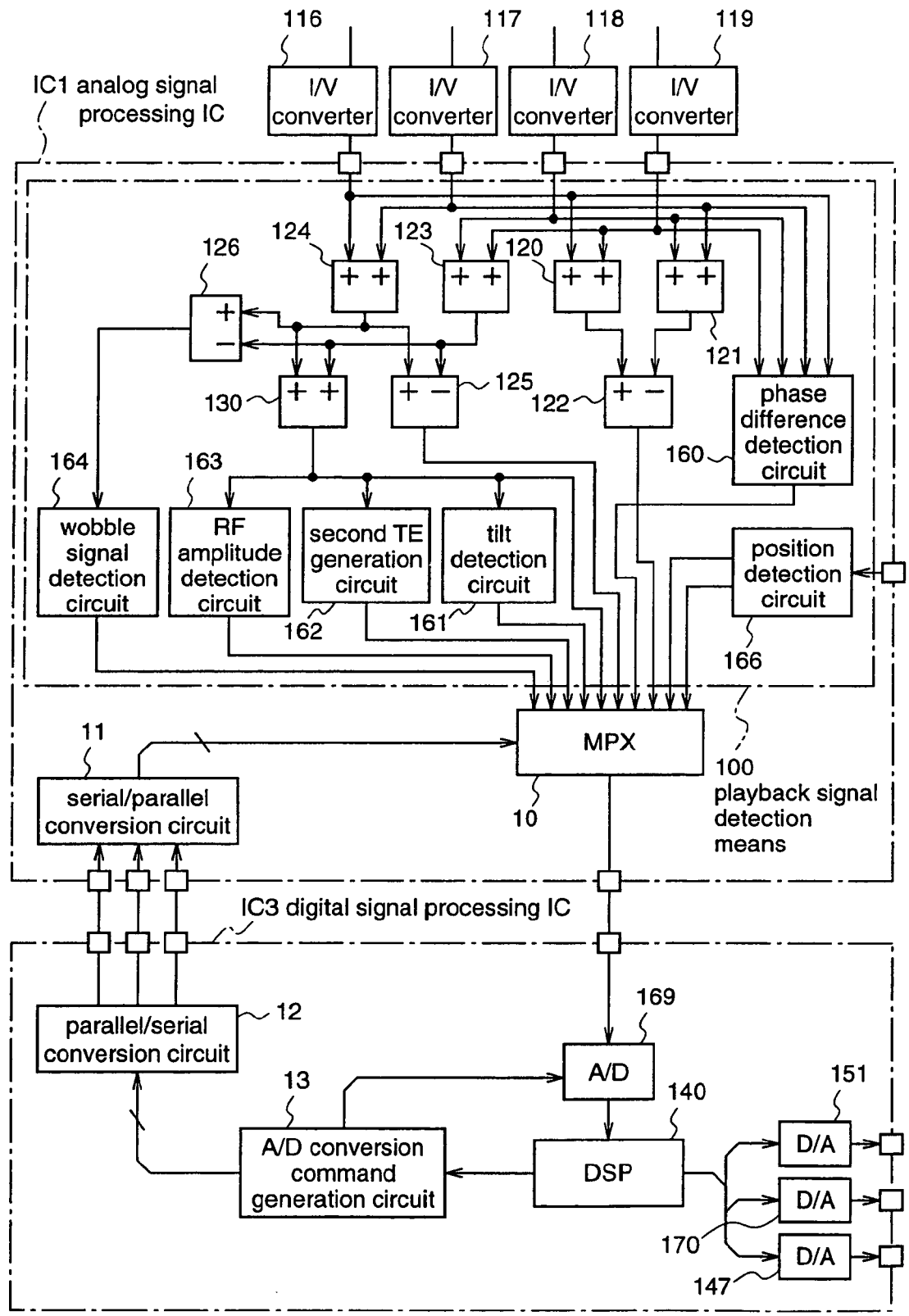
FIG. 1 is a block diagram illustrating an optical disk control device according to a first embodiment of the present invention.

Hereinafter, an optical disk control device according to a first embodiment of the present invention will be described with reference to FIG. 1. FIG. 1 is a block diagram illustrating the optical disk control device according to the first embodiment.

In this first embodiment, various kinds of signals outputted from a single analog signal processing IC are time-division-multiplexed and serial-transferred, and information to be used for switching control of the respective signals is also transferred as a serial signal, whereby the number of signal lines between the analog signal processing IC and a digital signal processing IC is reduced.

With reference to FIG. 1, IC1 denotes an analog signal processing IC (analog signal processing means) according to the first embodiment, and IC3 denotes a digital signal processing IC (digital signal processing means) according to the first embodiment.

Since digital control operations such as focusing servo and tracking servo are identical to those already described for the first prior art, repeated description is not necessary.

As in the first prior art, a reflected light beam from an optical disk is incident on a photodetector, and light beams if outputted from the photodetector are I/V converted by I/V converters 116, 117, 118, and 119, and thus obtained signals are inputted to the analog signal processing IC IC1.

Each of adders 120, 121, 123, 124, and 130 performs addition of input signals, and outputs the sum. Each of subtracters (differential circuits) 122, 125, and 126 performs subtraction of input signals, and outputs the difference.

To be specific, the adder 124 adds the outputs of the I/V converters 116 and 117, the adder 123 adds the outputs of the I/V converters 118 and 119, the adder 120 adds the outputs of the I/V converters 116 and 119, the adder 121 adds the outputs of the I/V converters 117 and 118, and the adder 130 adds the outputs of the adders 124 and 123. The subtracter 125 subtracts the output of the adder 123 from the output of the adder 124. The subtracter 122 subtracts the output of the adder 121 from the output of the adder 120.

The output from the subtracter 122 is a focusing error signal which indicates a deviation of the focal point of the light beam applied to the disk, from the information surface of the disk. The output from the subtracter 125 is a first TE signal in the push-pull method for making a spot on the disk follow the target track, and the output from a phase difference detection circuit 160 is a TE signal in the phase difference method.

Further, the output from the adder 130 is a total reflected light amount signal. The output from a tilt detection circuit 161 is a tilt control signal, the output from a second TE generation circuit 162 is a second TE signal, the output from an RF amplitude detection circuit 163 is an RF signal amplitude signal, and the output from a wobble signal detection circuit 164 is a wobble amplitude signal. A position detection circuit 116 outputs an amplified position detection signal, and a differentiated position detection signal. A playback signal detection means 100 is composed of the adders 120, 121, 123, 124, and 130, the subtracters 122, 125, and 126, the phase difference detection circuit 160, the tilt detection circuit 161, the second TE detection circuit 162, the RF amplitude detection circuit 163, the wobble signal detection circuit 164, and the position detection circuit 166. The output from the playback signal detection means 100 is a signal of information recorded on the disk, which is detected by irradiating the optical disk (not shown) with a converged light beam. A switching circuit 10 selects these control signals, and outputs a time-division-multiplexed signal to the digital signal processing IC IC3 through a single signal line.

On the other hand, in the digital signal processing IC IC3, an A/D converter (A/D conversion means) 169 converts the output from the switching circuit 10 into a digital signal. A DSP (arithmetic means) 140 receives the respective signals outputted as the digital signal, and selects the respective signals in the same order as the order in which the switching circuit 10 successively selected the signals, and performs signal processing on the selected signals successively.

That is, the DSP 140 performs the fundamental signal processing such as phase compensation while performing processing corresponding to demultiplexing, and the timing of signal selection corresponding to the demultiplexing is obtained by adding a delay due to A/D converting operation of the A/D converter 169, to the selection timing of the switching circuit 10 according to an A/D conversion command circuit 13 which is controlled by the DSP 140. After performing the fundamental signal processing such as phase compensation, the DSP 140 appropriately distributes the processed signals to D/A converters 151, 170, and 147, and the distributed signals are converted into analog signals by the D/A converters 151, 170, and 147. The analog signals drive the actuator and the like through a power amplifier (not shown).

In this first embodiment, the various control signals generated in the analog signal processing IC are supplied to the switching circuit 10 as a signal switching means (hereinafter also referred to as a multiplexer; MPX), and the switching circuit 10 is operated on the basis of a signal converted by a serial/parallel conversion circuit (serial reception means) 11, thereby successively selecting the respective control signals.

The signal converted by the serial/parallel conversion circuit 11 is formed on the basis of a conversion condition which is predetermined by the A/D conversion command generation circuit (A/D conversion command means) 13 included in the digital signal processing IC IC3.

The A/D conversion command generation circuit 13 predetermines the order in which the switching circuit 10 selects the respective control signals. This decision may be performed by searching a table which is stored in an internal ROM. The A/D conversion command generation circuit 13 transfers data which are generated from the determined conversion condition, to a parallel/serial conversion circuit (serial transfer means) 12. The parallel/serial conversion circuit 12 converts the parallel signal into a serial signal, and transfers the serial signal to the serial/parallel conversion circuit 11 included in the analog signal processing IC IC1. Although three signal lines are shown in FIG. 1, the original serial signal is one of the three signal lines (three-line serial transfer will be described later).

Accordingly, the A/D converter 169 performs the A/D converting operation as follows. The signal, which is generated on the basis of the conversion condition predetermined by the A/D conversion command generation circuit 13, is transferred between the parallel/serial conversion circuit 12 and the serial/parallel conversion circuit 11, and the respective control signals are successively selected by the switching circuit 10 on the basis of the signal converted by the serial/parallel conversion circuit 11, and the selected signals are successively transferred to the A/D converter 169.

As described above, in the optical disk control device arty according to the first embodiment, the respective output signals from the analog signal processing IC of the optical disk drive are time-division-multiplexed by the multiplexer, and transferred to the digital signal processing IC through a single signal line. In the digital signal processing IC, the multiplexed signal is subjected to processing corresponding to demultiplexing, and the control signal for controlling the signal selection order of the multiplexer is subjected to parallel to serial conversion and then transferred from the digital signal processing IC to the analog signal processing IC. In the analog signal processing IC, the serial signal is restored to the parallel signal, and the restored control signal is used for controlling the signal selection of the multiplexer. Therefore, the number of signal lines between the analog signal processing IC and the digital signal processing IC is significantly reduced while many signal lines are required between the ICs in the conventional device, thereby providing a highly-reliable optical disk control device which can suppress an increase in the cost of the optical disk drive.

[Embodiment 2]

Figure 2:
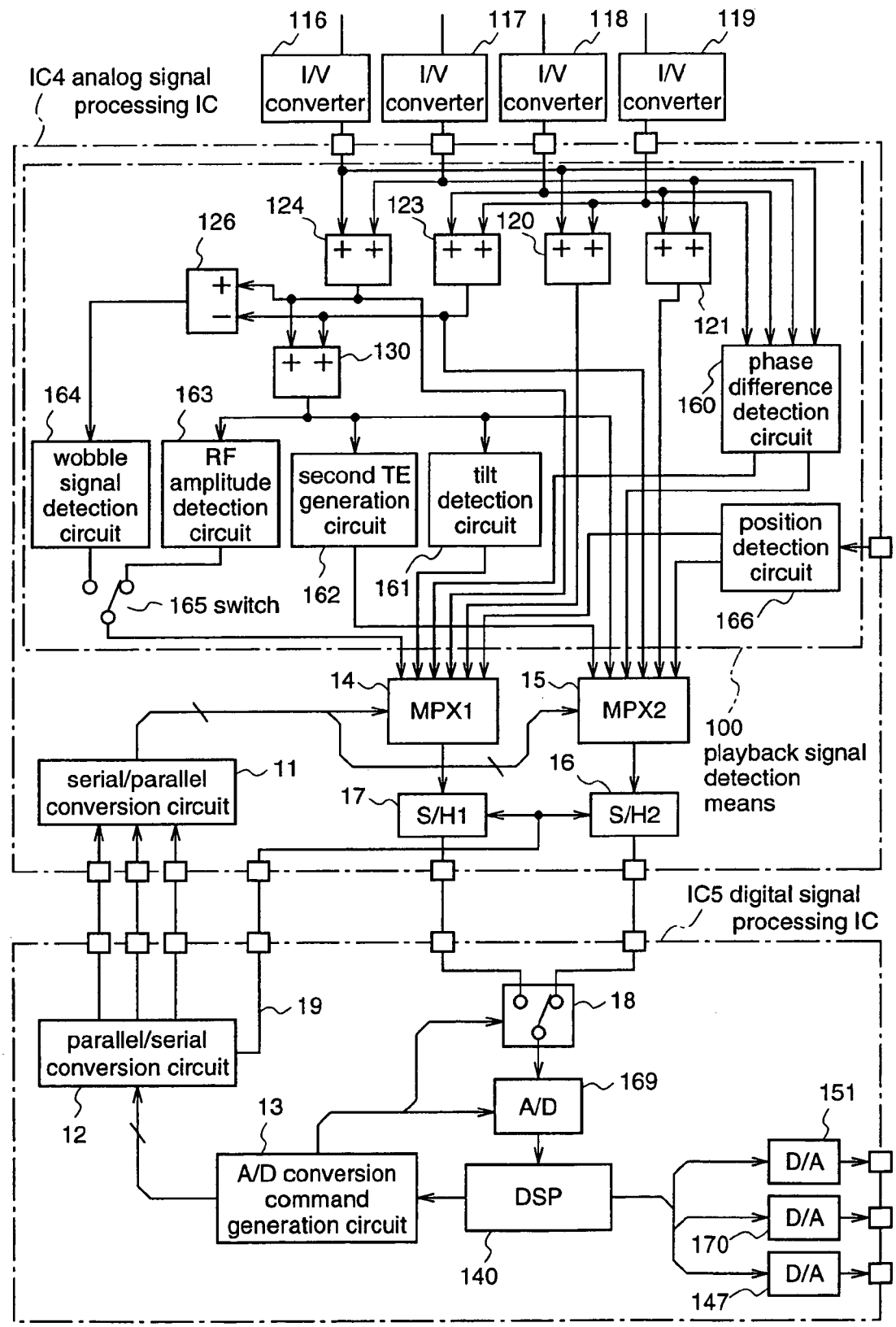
FIG. 2 is a block diagram illustrating an optical disk control device according to a second embodiment of the present invention.

Hereinafter, an optical disk control device according to a second embodiment of the invention will be described with reference to FIG. 2. FIG. 2 is a block diagram illustrating the optical disk control device according to the second embodiment.

In this second embodiment, among the respective signals which are time-division-multiplexed and serial-transferred in the first embodiment, as for paired signals a difference between which is obtained before time-division multiplexing, the paired signals themselves are time-division-multiplexed and serial-transferred, whereby the circuit scale of the analog signal processing IC is reduced.

With reference to FIG. 2, IC4 denotes an analog signal processing IC (analog signal processing means) according to the second embodiment, and IC5 denotes a digital signal processing IC (digital signal processing means) according to the second embodiment.

Since the digital control operations such as focusing servo and tracking servo are identical to those described for the first prior art, repeated description is not necessary.

The analog signal processing IC IC4 is supplied with signals which are obtained by I/V converting a light beam that is reflected at an optical disk and applied onto a photodetector, by I/V converters 16, 117, 118, and 119, as in the prior art.

Each of adders 120, 121, 123, 124, and 130 performs addition of input signals. These adders are connected in the same manner as described with respect to FIG. 1. The outputs from the adders 120 and 121 are focusing error signals before subtraction, each indicating a deviation of the focal point of the light beam applied to the disk from the information surface of the disk, and these focusing error signals are individual signals outputted from the photodetector for focusing. The output from the adder 120 is referred to as FE+, and the output from the adder 121 is referred to as FE−. Further, the outputs from the adders 123 and 124 are first TE signals in the push-pull method for making the spot on the disk follow the target track. Like the focusing error signals, the output from the adder 124 is referred to as TE+, and the output from the adder 123 is referred to as TE−. The outputs from a phase difference detection circuit 160 are TE signals in the phase difference method, which are referred to as DPDTE+ and DPDTE−, respectively.

The output from the adder 130 is a total reflected light amount signal. The output from a tilt detection circuit 161 is a tilt control signal, and the output from a second TE generation circuit 162 is a second TE signal. Further, the output from an RF amplitude detection circuit 163 is an RF signal amplitude signal, and the output from a wobble signal detection circuit 164 is a wobble amplitude signal. A switch 165 selects either the RF signal amplitude signal or the wobble amplitude signal. A position detection circuit 166 outputs an amplified position detection signal (hereinafter referred to as RTPS) and a differentiated position detection signal (hereinafter referred to as DTPS). A playback signal detection means 100 includes the switch 165 for selecting either the output of the wobble signal detection circuit 164 or the output of the RF amplitude detection circuit 163, in addition to the constituents described for the first embodiment.

On the other hand, in the digital signal processing IC IC5, various control signals selected by a switch 18 are converted into digital signals by an A/D converter (A/D conversion means) 169. The respective control signals captured as digital signals are subjected to processing such as phase compensation by a DSP (arithmetic means) 140, and converted into analog signals by D/A converters 151, 170, and 147. These analog signals drive the actuator and the like through a power amplifier (not shown).

In this second embodiment, the respective control signals generated in the analog signal processing IC IC4 are applied to a first switching circuit 14 and a second switching circuit 15, and the first and second switching circuits 14 and 15 are operated on the basis of a parallel signal obtained in a serial/parallel conversion circuit 11, thereby selecting the respective control signals.

The control signals inputted to the first and second switching circuits 14 and 15 are as follows. For example, the FE+, TE+, DPDTE+, RTPS, tilt control signal, and either the RF signal amplitude signal or the wobble amplitude signal which is selected by the switch 165, are inputted to the first switching circuit 14, while the FE−, TE−, DPDTE−, DTPS, total reflected light amount signal, and the second TE signal are inputted to the second switching circuit 15.

The FE+ and FE− are paired signals, and a difference between these signals is obtained as an FE signal by the subtracter 122 in the first embodiment, and the FE signal is time-division-multiplexed by the switching circuit 10 to be transferred to the digital signal processing IC. In this second embodiment, however, the paired signals FE+ and FE−, which are original signals of the FE signal, are time-division-multiplexed by the switching circuits 14 and 15, respectively, to be transferred to the digital signal processing IC. The TE+, DPDTE+, TE−, and DPDTE− are processed in the same way as described above.

The signal converted by the serial/parallel conversion circuit 11 is generated on the basis of a conversion condition which is predetermined by an A/D conversion command generation circuit 13 included in the digital signal processing IC IC5.

The A/D conversion command generation circuit 13 predetermines the orders in which the first switching circuit 14 and the second switching circuit 15 (signal switching means) select the respective control signals. A parallel signal generated on the basis of the determined conversion condition is transferred to a parallel/serial conversion circuit 12. The parallel/serial conversion circuit 12 converts the parallel signal into a serial signal, and transfers the serial signal to the serial/parallel conversion circuit 11 in the analog signal processing IC IC4. Although three signal lines are shown in FIG. 2, the original serial signal is one of the three signal lines (three-line serial transfer will be described later). Further, the parallel/serial conversion circuit 12 outputs a sampling pulse signal 19 (hereinafter referred to as SHP) having a predetermined width of time, at a predetermined timing, on the basis of a conversion command outputted from the A/D conversion command generation circuit 13.

The respective control signals which have been time-division-multiplexed by the first switching circuit 14 and the second switching circuit 15 are sampled and held by a first S/H circuit 17 and a second S/H circuit 16, at the timing of the sampling pulse signal 19, respectively. The first S/H circuit 17 and the second S/H circuit 16 sample and hold the signals selected by the first switching circuit 14 and the second switching circuit 15 at the same time, whereby the A/D converted signals of the both signals outputted from the first switching circuit 14 and the second switching circuit 15 are obtained in the same period of time.

For example, when the first switching circuit 14 selects the FE+ and the second switching circuit 15 selects the FE−, these signals are sampled and held by the first S/H circuit 17 and the second S/H circuit 16, respectively. Thereafter, either the FE+ or the FE− is selected by a switch 18, and the selected signal is converted into a digital signal by the A/D converter 169. This digital signal is a signal in the same period of time as the FE+ and FE− signals.

Accordingly, the A/D converting operation is carried out as follows. The signal generated on the basis of the conversion condition which is predetermined by the A/D conversion command generation circuit 13 is transferred from the parallel/serial conversion circuit 12 to the serial/parallel conversion circuit 11, and the respective control signals are successively selected by the first switching circuit 14 and the second switching circuit 15, on the basis of the signal converted by the serial/parallel conversion circuit 11. Then, the control signals outputted from the first switching circuit 14 and the second switching circuit 15 are sampled and held by the first S/H circuit 17 and the second S/H circuit 16 for every conversion command, and are successively transferred to the A/D converter 169, thereby A/D converting the respective control signals.

Next, the A/D converting operation will be described in more detail with reference to FIG. 3.

The A/D conversion command generation circuit 13 outputs A/D conversion commands. In FIG. 3, "A/D conversion command" shows the case where conversion commands are outputted in the order of A signal conversion, B signal conversion, and C signal conversion, but conversion commands of arbitrary signals may be set. The A/D conversion commands have information for signal selection (i.e., A signal, B signal, and C signal), and are transferred through the parallel/serial conversion circuit 12 to the serial/parallel conversion circuit 11 in the analog signal processing IC IC4. The communication mode between the parallel/serial conversion circuit 12 and the serial/parallel conversion circuit 11 is a general communication mode for serial signals, and three-line transfer of serial clock (hereinafter referred to as SCK), serial enable (hereinafter referred to as SEN), and serial data (hereinafter referred to as SDAT) is carried out.

The three-line serial transfer will be described in more detail with reference to FIGS. 4 and 5.

Figure 4:
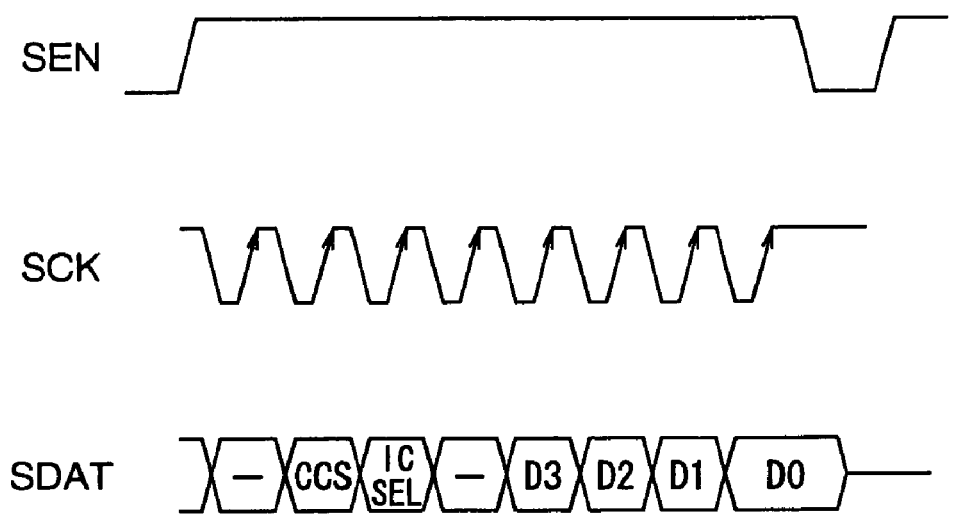
FIG. 4 is a diagram for explaining 8-bit transfer for A/D conversion according to the present invention.
Figure 5:
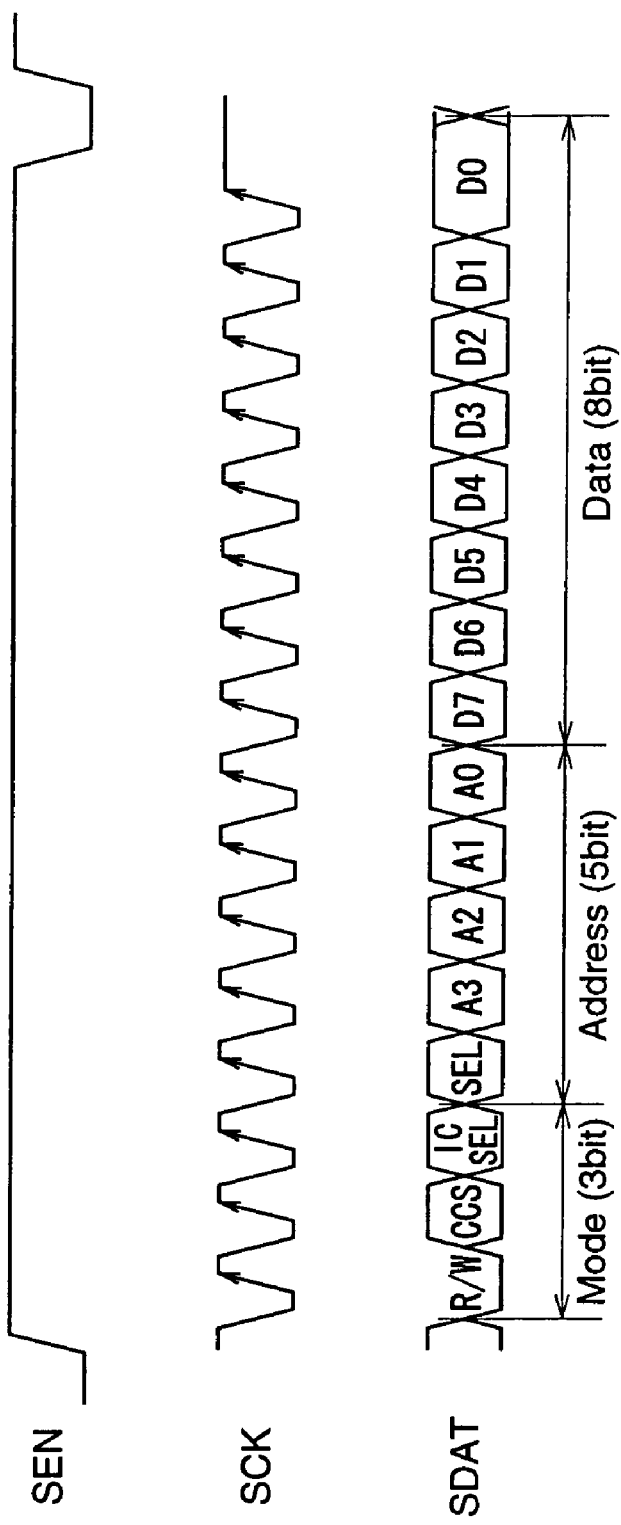
FIG. 5 is a diagram for explaining 16-bit transfer for state setting according to the present invention.

FIG. 4 shows 8-bit serial transfer for A/D conversion, and FIG. 5 shows 16-bit serial transfer for IC internal state setting. In the communication between the ICs, both of the A/D conversion 8-bit transfer and the internal state setting 16-bit transfer are used.

In FIG. 4, SEN denotes a signal for determining valid/invalid during transfer, and its high level shows the valid state during transfer. Further, this SEN signal is a serial/parallel conversion end signal, and it is also a signal to be stored in an internal register. SCK is a clock for latching serial-transferred data, and the receiving end latches the data at the rising edge of this clock. SDAT is serial-transferred data, and D0 to D3 are control signal selection bits, and sixteen kinds of control signals can be selected by D0 to D3. ICSEL is an IC selection bit, and two kinds of ICs can be selected by ICSEL. CCS is a bit for distinguishing the transfer mode between the A/D conversion 8-bit transfer and the internal state setting 16-bit transfer.

In FIG. 5, SEN is a signal for determining valid/invalid during transfer, and its high level indicates the valid state during transfer. Further, this SEN signal is a serial/parallel conversion end signal, and it is also a signal to be stored in an internal register. SCK is a clock for latching serial-transferred data, and the receiving end latches the data at the rising edge of this clock. SDAT is serial-transferred data, and D0 to D7 are bits of state setting registers (not shown). A0 to A3 are state setting register selection bits, and sixteen kinds of state setting registers can be selected. SEL can select the above-mentioned A0 to A3 state setting registers with respect to two kinds of function blocks. For example, when SEL is "1", a state setting register in a block for signal processing is selected. When SEL is "0", a state setting register in a block for servo control is selected. ICSEL is an IC selection bit, and two kinds of ICs can be selected by ICSEL. CCS is a bit for distinguishing the transfer mode between the A/D conversion 8-bit transfer and the internal state setting 16-bit transfer. R/W is a bit for selecting either reception or transfer in serial communication.

Figure 3:
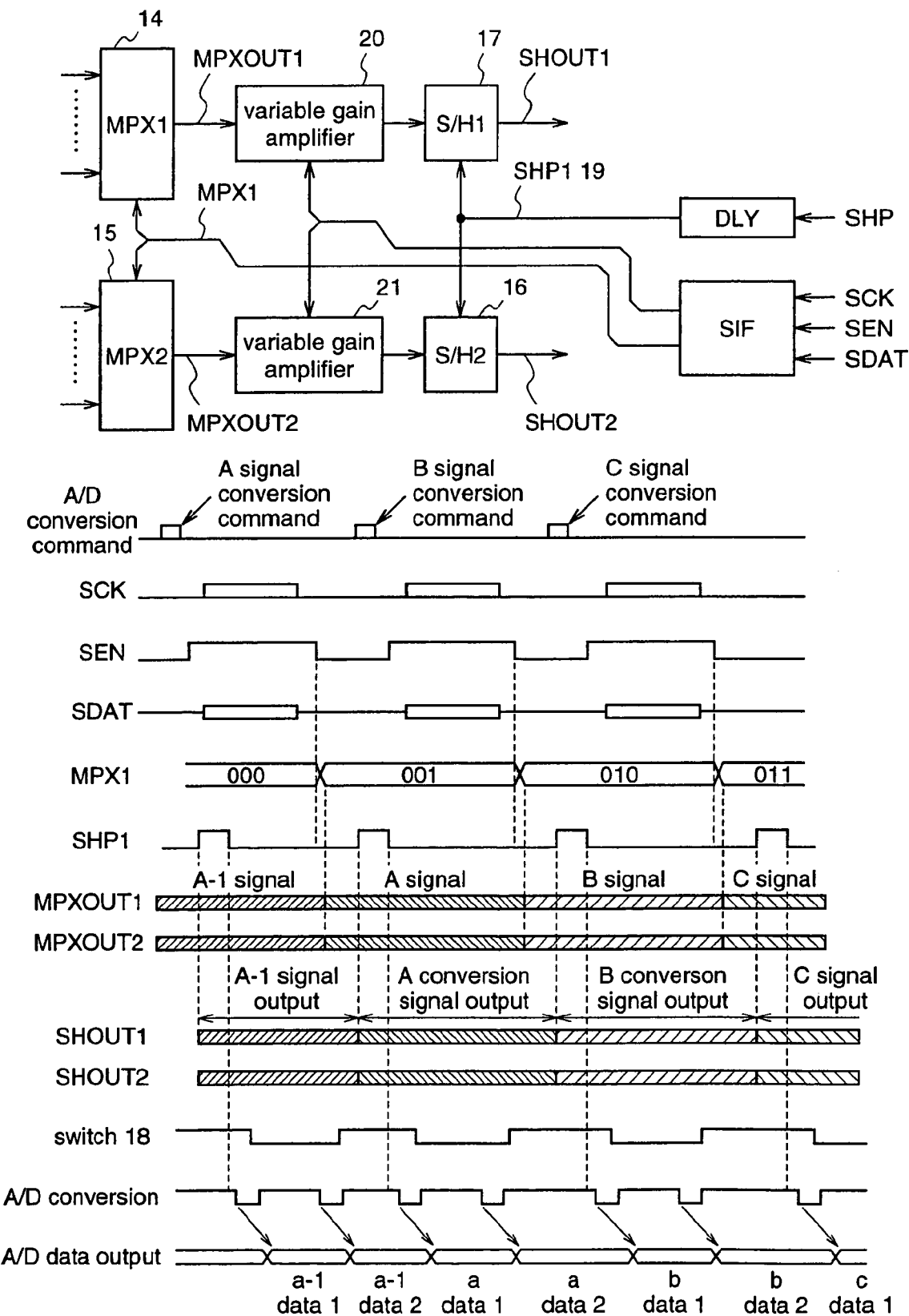
FIG. 3 is a diagram for explaining A/D converting operation according to the second embodiment of the invention.

As shown in a time chart of FIG. 3, the SCK, SEN, and SDAT transferred from the parallel/serial conversion circuit 12 are outputted on the basis of the A/D conversion command, and the SEN signal indicating valid/invalid of serial data transfer is set at high level (valid) to perform data transfer. After the data transfer has ended, the SEN signal is set at low level (invalid).

The serial data inputted to the serial/parallel conversion circuit 11 is subjected to serial/parallel conversion to demodulate the signal selection information and the like, and the signal selection order is set to the first switching circuit 14 (MPX1) and to the second switching circuit 15 (MPX2) according to the result of demodulation, whereby the first switching circuit 14 (MPX1) and the second switching circuit 15 (MPX2) output the signals (A signal, B signal, and C signal) corresponding to the selected signals. This output is carried out in the order of A-1 signal, A signal, B signal, and C signal. The timing at which the first switching circuit 14 (MPX1) and the second switching circuit 15 (MPX2) change the selected signals coincides with the falling edge of the SEN signal indicating the end of serial data transfer. The timing at which the control signals outputted from the first switching circuit 14 (MPX1) and the second switching circuit 15 (MPX2) are sampled and held by the first S/H circuit 17 (S/H1) and the second S/H circuit 16 (S/H2) is determined by the sample hold pulse signal 19 (hereinafter referred to as SHP1), and the SHP1 19 is generated after a predetermined period of time on the basis of the A/D conversion command timing. Further, the timing at which the first S/H circuit 17 (S/H1) and the second S/H circuit 16 (S/H2) perform sample-and-hold may be obtained by generating the SHP1 19 with a delay of a predetermined time, which is made by a delay circuit DLY, from the falling edge of the SEN signal indicating the end of data transfer. In either case, the SHP1 output timing must be set to a timing at which the output signals from the first switching circuit 14 (MPX1) and the second switching circuit 15 (MPX2) are actually sampled and held by the first S/H circuit 17 (S/H1) and the second S/H circuit 16 (S/H2), respectively.

Next, the control signals which are sampled and held by the first S/H circuit 17 (S/H1) and the second S/H circuit 16 (S/H2) are maintained in the hold states from when they are sampled to when they are sampled next, and these control signals become an A conversion signal, a B conversion signal, and a C conversion signal which are delayed by the predetermined time from the outputs SHOUT1 and SHOUT2 of the analog signal processing IC IC4, and these signals are time-division-transferred to the A/D converter in the digital signal processing IC IC5.

The switch 18 provided immediately before the A/D converter 169 successively selects the time-division-transferred signals (A signal, B signal, and C signal) outputted from the first S/H circuit 17 and those signals outputted from the second S/H circuit 16, whereby the two signals SHOUT1 and SHOUT2 in the hold states are successively A/D converted.

Further, as for the control signals outputted from the first switching circuit 14 (MPX1) and the second switching circuit 15 (MPX2), the gains of the control signals to be selected next can be varied by variable gain amplifiers (variable gain amplification means) 20 and 21 by utilizing that the previous control signals are outputted in their hold states. Therefore, the paired signals such as FE+ and FE− can be subjected to processing such that the gain of one signal is made different from the gain of the other signal. The gain changes of the variable gain amplifiers 20 and 21 are set by the state-setting 16-bit serial transfer which is outputted from a serial interface SIF, and are set by performing the state-setting 16-bit serial transfer at the end of the A/D conversion 8-bit transfer or between the A/D conversion 8-bits transfers.

As described above, in the optical disk control device according to the second embodiment, the various signals outputted from the analog signal processing IC of the optical disk drive are time-division-multiplexed by the multiplexer and transferred to the digital signal processing IC through a single signal line. In the digital signal processing IC, the respective signals are subjected to processing corresponding to demultiplexing, and the control signal for controlling the order of signal selection by the multiplexer is parallel-to-serial converted and transferred from the digital signal processing IC to the analog signal processing IC, and the serial signal is restored to the parallel signal in the analog signal processing IC. Therefore, the number signal lines between the analog signal processing IC and the digital signal processing IC is significantly reduced while many signal lines are required between the ICs in the conventional device, thereby providing a highly-reliable optical disk control device which can suppress an increase in the cost of the optical disk drive.

In the first embodiment, the paired signals, such as the output signals from the adders 124 and 123 for obtaining the focusing error signal, the output signals from the adders 120 and 121 for obtaining the TE signal in the phase difference signal, or the like, are subjected to subtraction to obtain a difference between them in the analog signal processing IC before being time-division-multiplexed and transferred. In this second embodiment, however, the paired signals are time-division-multiplexed and transferred to the digital signal processing IC as they are, and a difference between them is obtained by software in the DSP of the digital signal processing IC. Therefore, the circuit scale of the analog signal processing IC is reduced, and processing such that the gain of one of the paired signals is made different from the gain of the other signal can be easily carried output.

[Embodiment 3]

Figure 6:
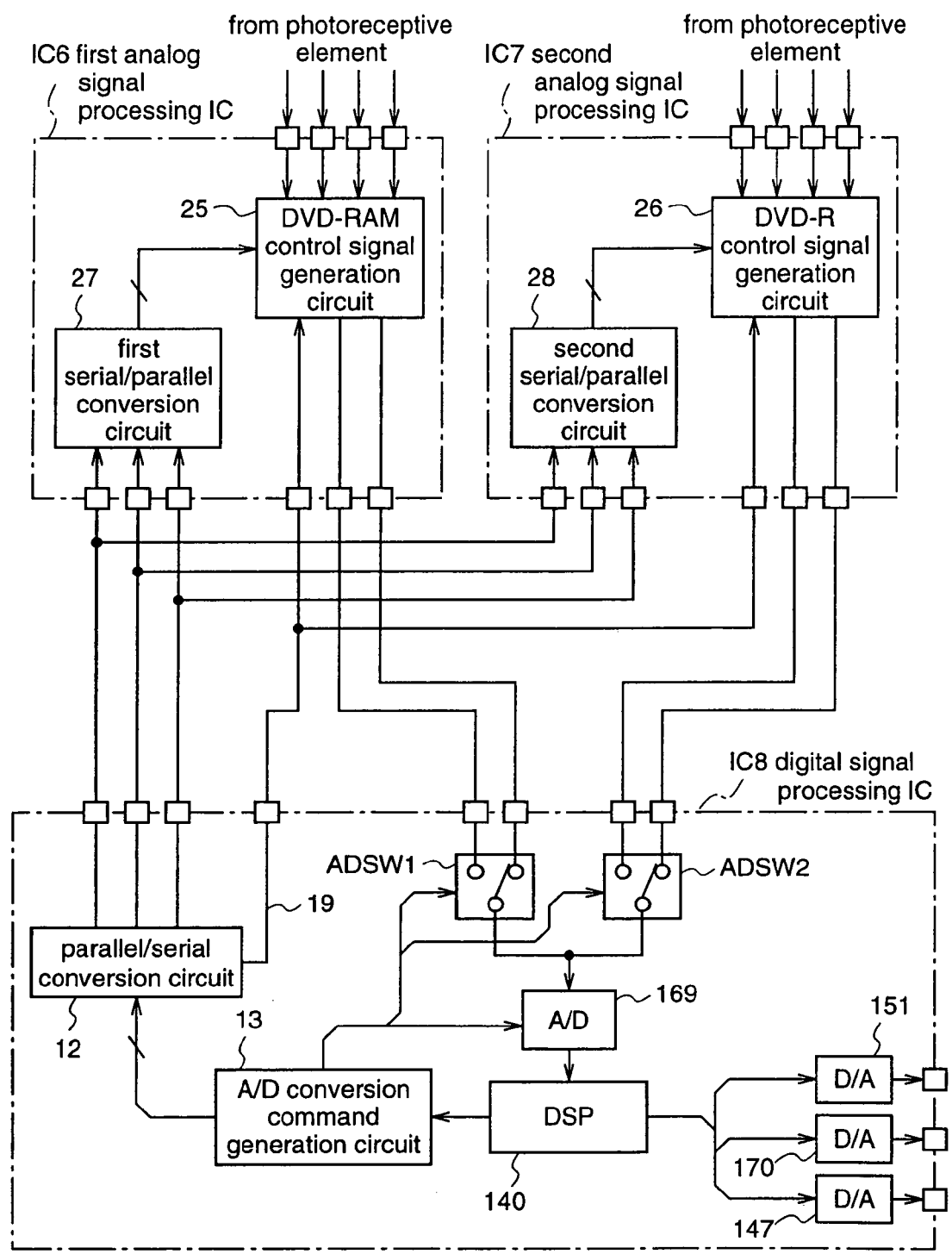
FIG. 6 is a block diagram illustrating an optical disk control device according to a third embodiment of the present invention.

Hereinafter, an optical disk control device according to a third embodiment of the present invention will be described with reference to FIG. 6. FIG. 6 is a block diagram illustrating the optical disk control device according to the third embodiment.

The optical disk control device of this third embodiment is provided with a plurality of analog signal processing ICs whose circuit scales are reduced by time-division-multiplexing pairs of signals as they are and transferring the signals, according to the kinds of optical disks to deal with, and the outputs from the analog signal processing ICs are selectively used by a digital signal processing IC, thereby providing an optical disk control device which is superior in point of cost and reliability, without increasing the number of connection lines between the ICs, when an accommodation to plural kinds of disks is realized.

In FIG. 6, IC6 denotes a first analog signal processing IC (analog signal processing means), IC7 denotes a second analog signal processing IC (analog signal processing means), and IC8 denotes a digital signal processing IC (digital signal processing means)

Preferably, the analog signal processing IC IC6 is an IC adapted to DVD-RAM, and the analog signal processing IC IC7 is an IC adapted to DVD-R.

The IC6 is composed of a first serial/parallel conversion circuit (serial reception means) 27 and a DVD-R control signal generation circuit 25 which includes circuits corresponding to the playback signal detection means 100, the switching circuits 14 and 15, and the sample hold circuits 17 and 16 shown in FIG. 2. The IC7 is composed of a second serial/parallel conversion circuit (serial reception means) 28 and a DVD-R control signal generation circuit 26 which includes circuits corresponding to the playback signal detection means 100, the switching circuits 14 and 15, and the sample hold circuits 17 and 16 shown in FIG. 2.

Since the fundamental A/D converting operation is identical to that described for the second embodiment, repeated description is not necessary.

In this third embodiment, various control signals generated in the analog signal processing ICs IC6 and IC7 are time-division-transferred from the IC6 or the IC7, in the order which is decided on the basis of a conversion condition that is predetermined by an A/D conversion command generation circuit (A/D conversion command means) 13 included in the digital signal processing IC (digital signal processing means).

A parallel signal which is generated on the basis of the conversion condition predetermined by the A/D conversion command generation circuit 13 is transferred to a parallel/serial conversion circuit (serial transfer means) 12, and the parallel/serial conversion circuit 12 converts the parallel signal into a serial signal, and transfers the serial signal to the serial/parallel conversion circuits 27 and 28 which are included in the analog signal processing ICs IC6 and IC7, respectively. Further, the parallel/serial conversion circuit 12 outputs an SHP signal 19 having a predetermined width of time, at a predetermined timing, on the basis of a conversion command from the A/D conversion command generation circuit 13.

The transferred serial data is a signal having signal selection information and IC selection information which are outputted from the A/D conversion command generation circuit 13, and it is demodulated by the serial/parallel conversion circuits (serial reception means) 27 and 28 in the ICs IC6 and IC7, respectively, whereby a control signal which specifies an analog signal processing IC specified by the A/D conversion command is outputted.

Figure 7:
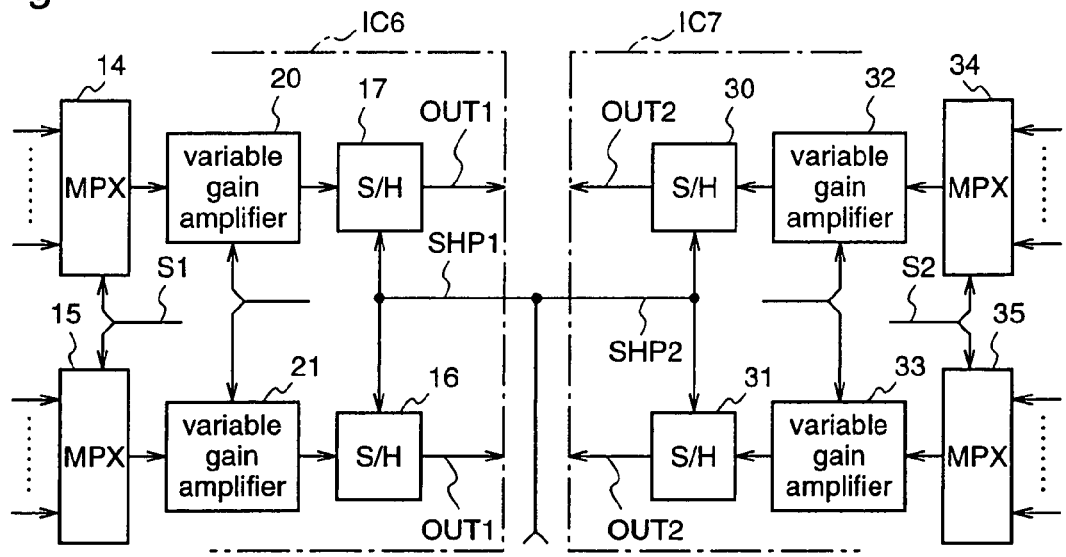
FIG. 7 is a diagram for explaining A/D converting operation according to the third embodiment of the invention.
Figure 7:
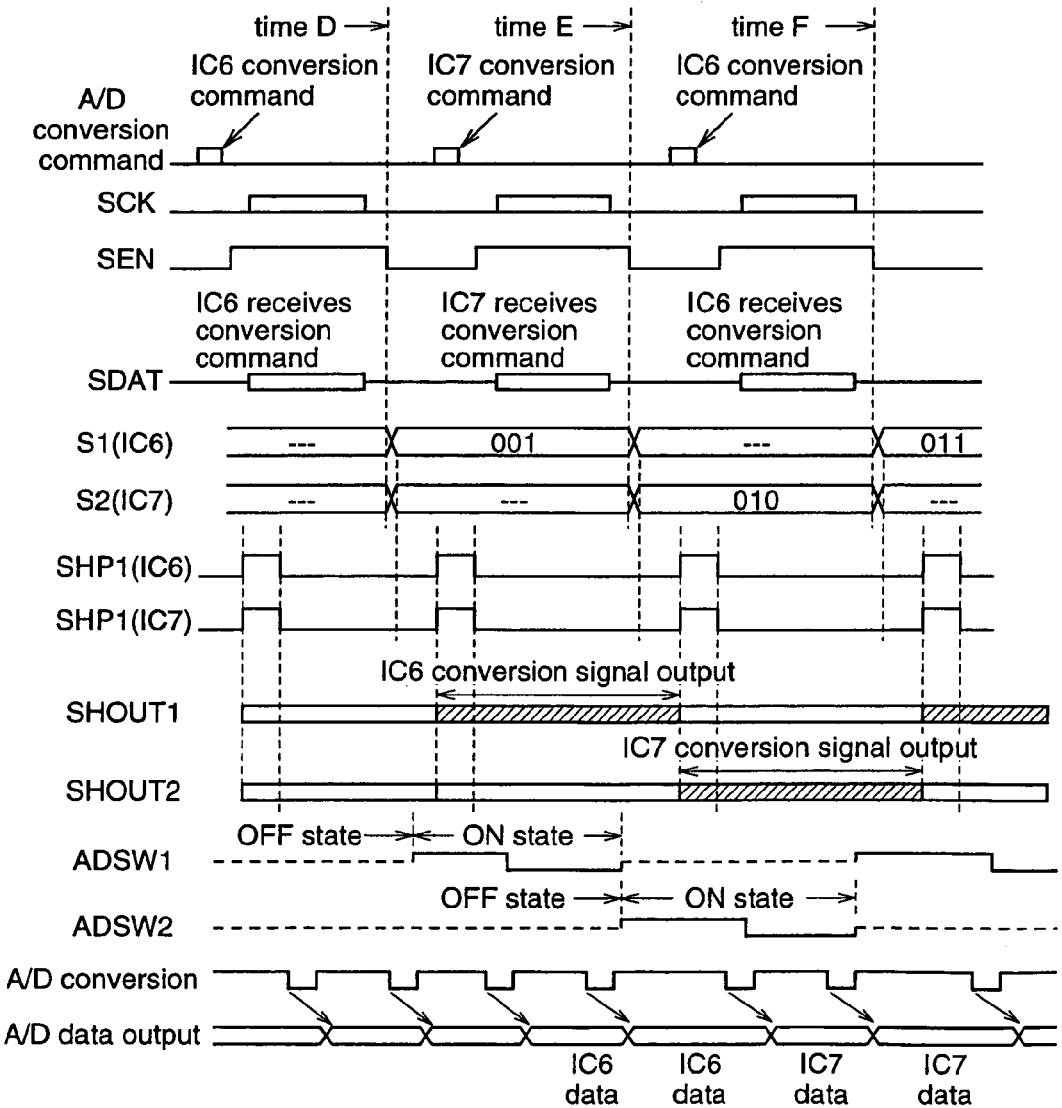
Figure 8:
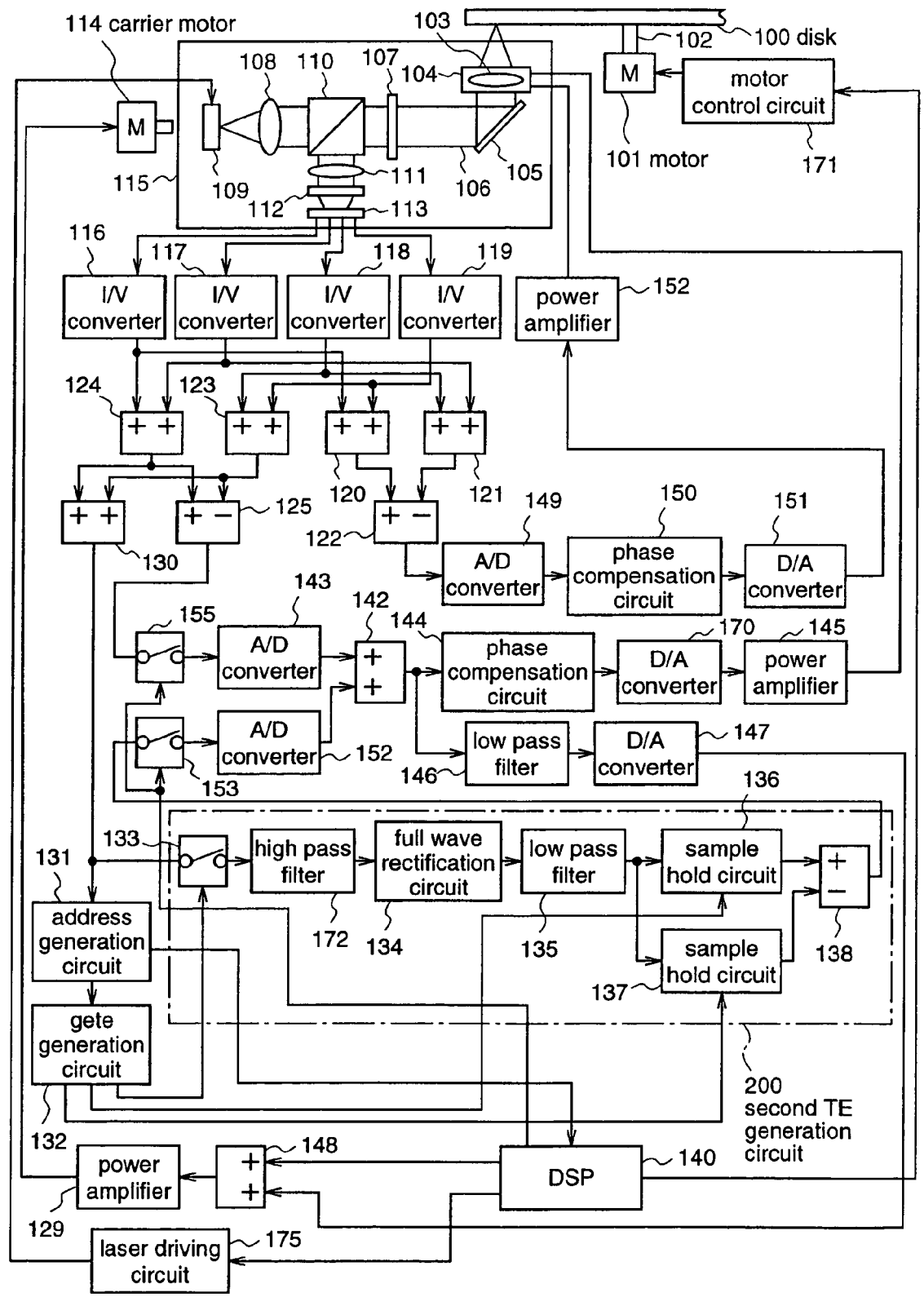
FIG. 8 is a block diagram illustrating an optical disk drive according to a first prior art.
Figure 9:
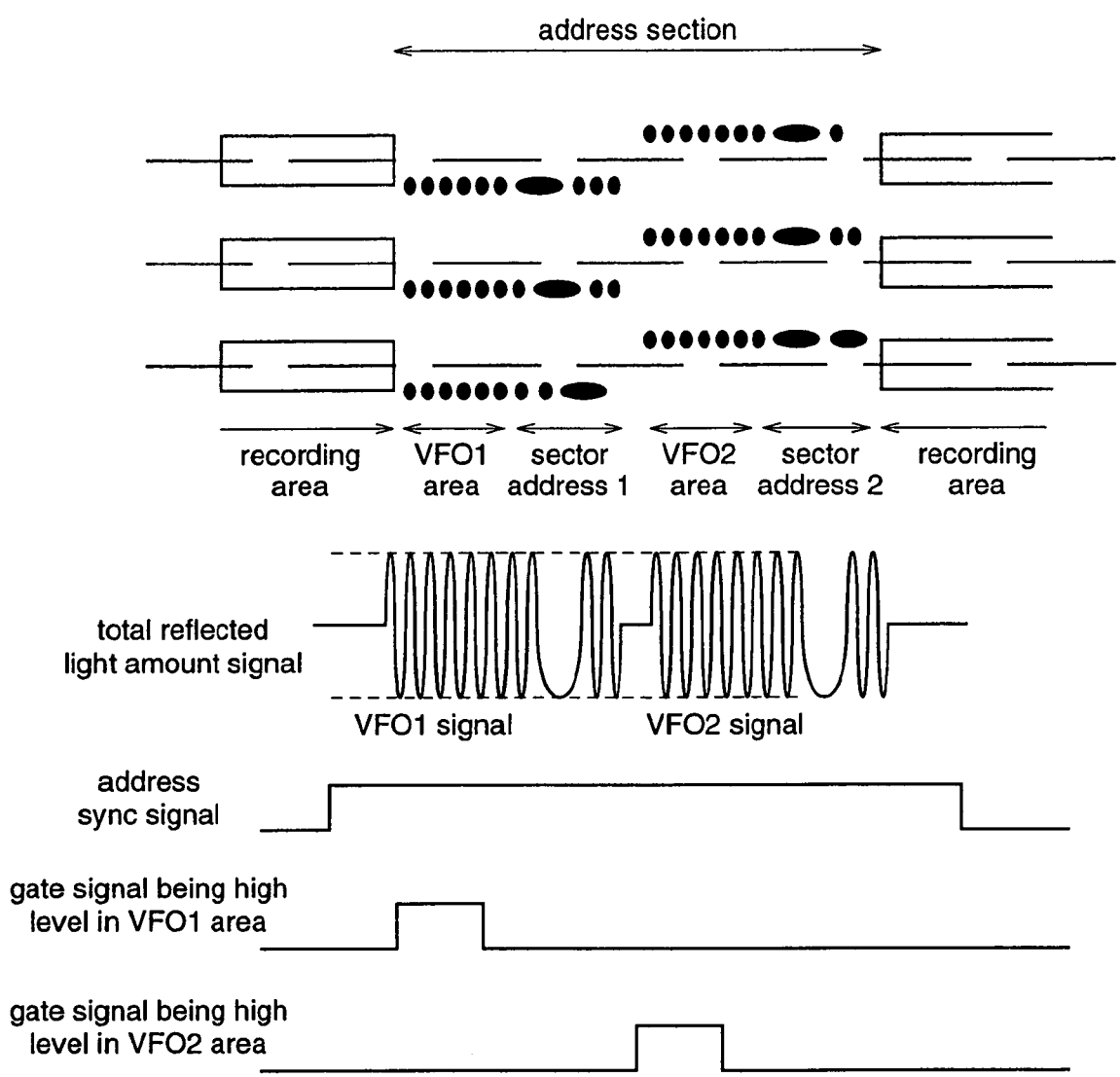
FIG. 9 is a diagram for explaining the relationship between an address section and a gate signal in the first prior art.
Figure 10:
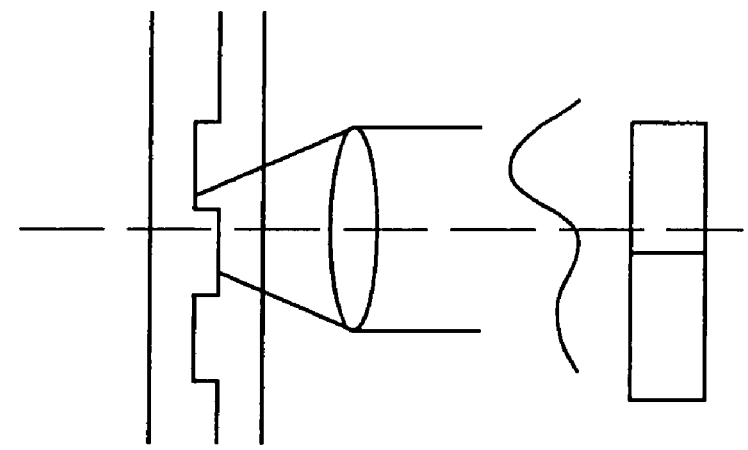
FIGS. 10(a)–10(c) are diagrams for explaining the relationships among a light beam, a groove, and a detected signal, according to the push-pull method employed in the first prior art.
Figure 10:
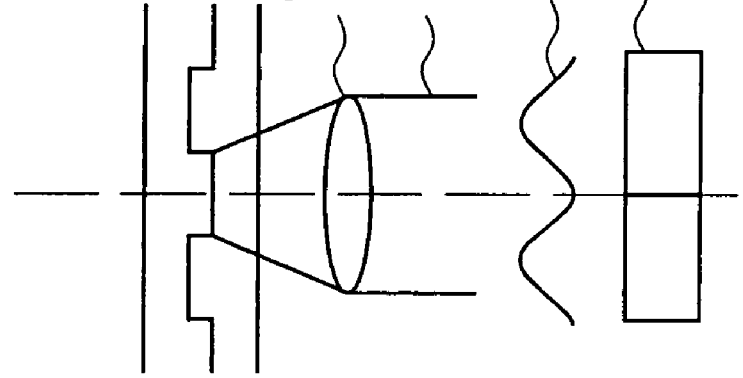
Figure 10:
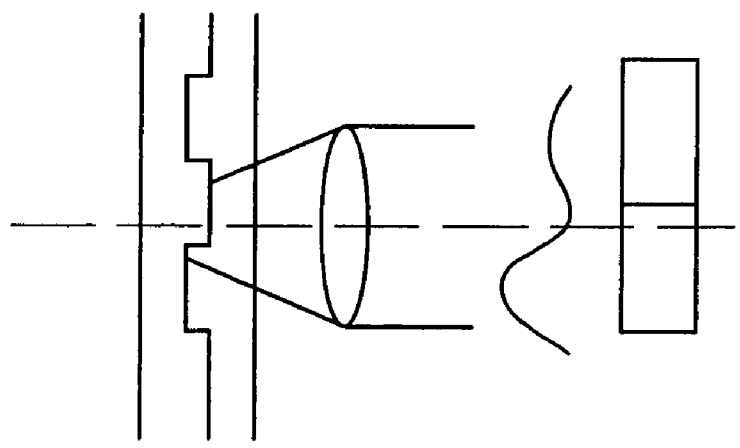
Figure 11:
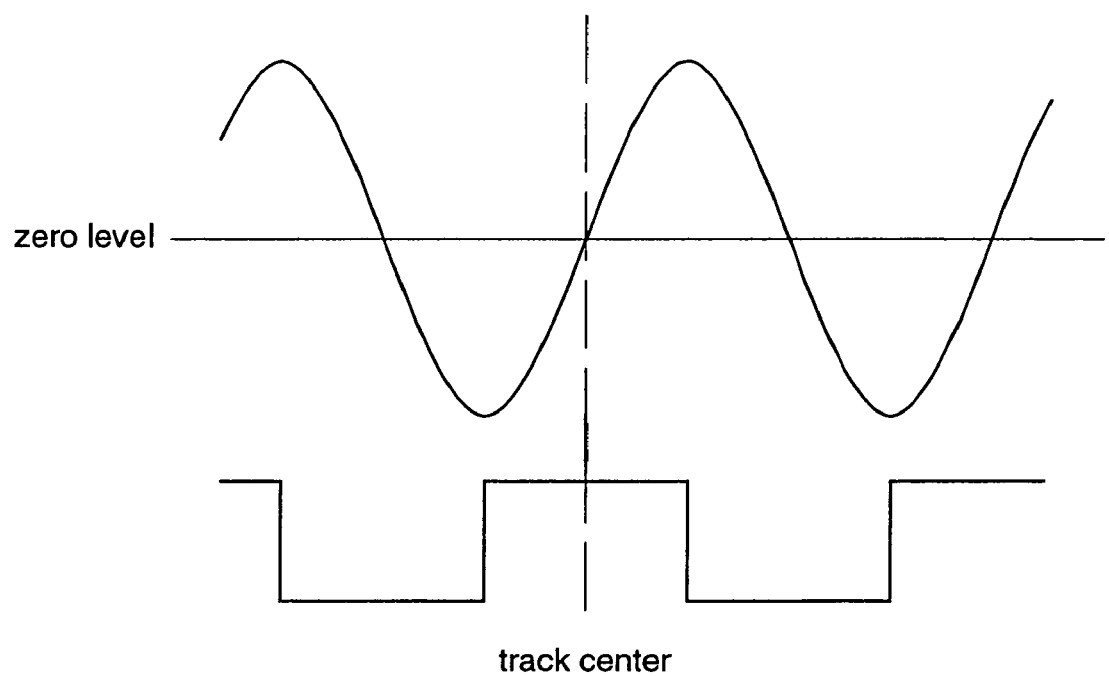
FIG. 11 is a diagram for explaining the relationship between a TE signal and a track according to the push-pull method in the first prior art.
Figure 12:
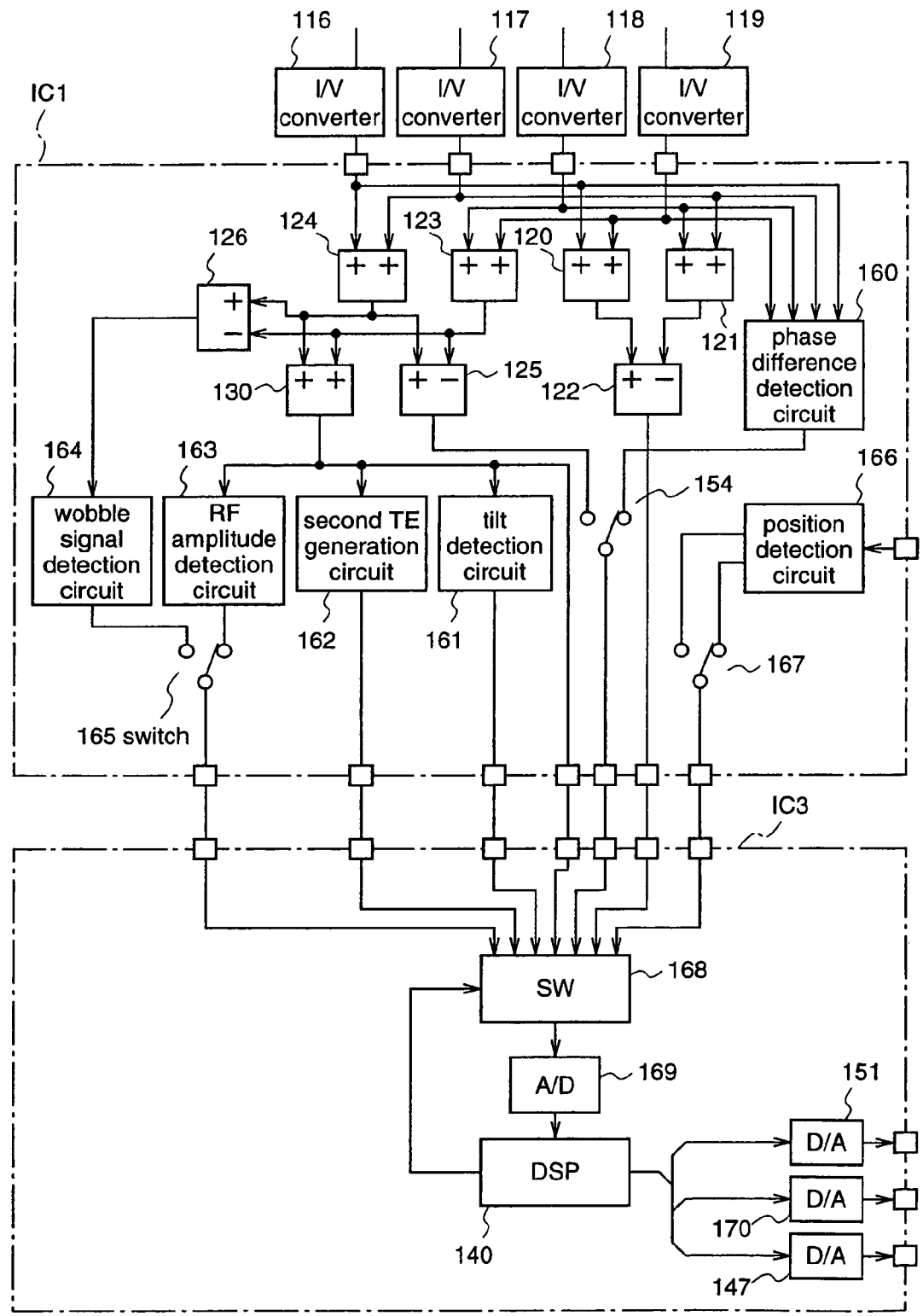
FIG. 12 is a block diagram illustrating an optical disk drive according to a second prior art.
Figure 13:
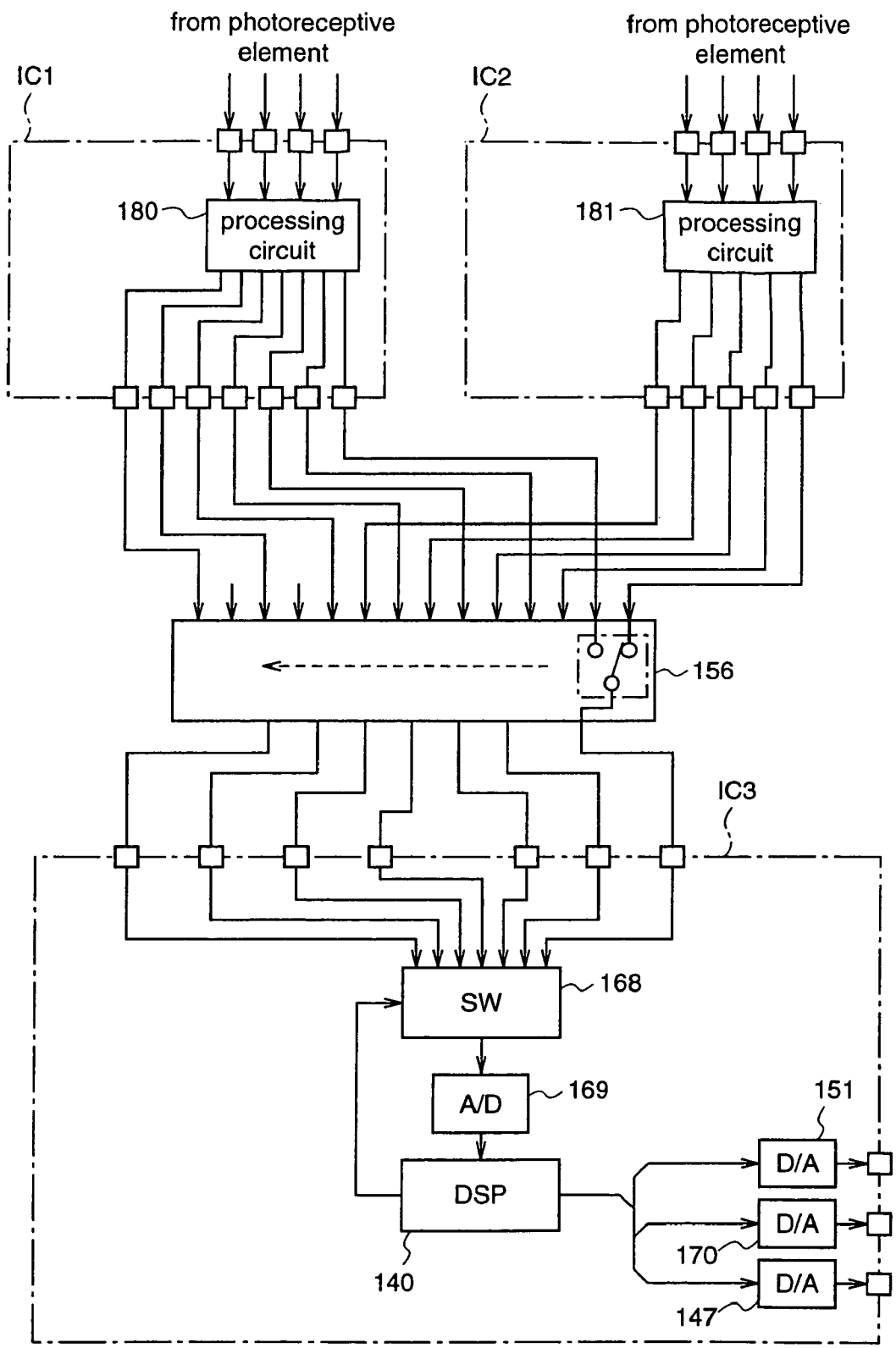
FIG. 13 is a block diagram illustrating an optical disk drive according to a third prior art.

Next, the A/D converting operation will be described in more detail with reference to a time chart shown in FIG. 7. The A/D conversion command generation circuit 13 outputs A/D conversion commands. Although, in FIG. 7, "A/D conversion command" shows the case where conversion commands are outputted in the order of IC6 conversion→IC7 conversion→IC6 conversion, arbitrary signals may be set. Each A/D conversion command has signal selection information and IC selection information (e.g., selection of IC6 or IC7), and it is transferred through the parallel/serial conversion circuit 12 to the serial/parallel conversion circuit 11 in the analog signal processing IC.

The serial data inputted to the serial/parallel conversion circuit of each IC is converted into parallel data, and the signal selection information and the IC selection information are demodulated. According to the result of demodulation, either the switching circuits (MPX) 14 and 15 of the IC6 or the switching circuits (MPX) 34 and 35 of the IC7 are set. For example, at time D when the IC6 is selected according to the A/D conversion command, the IC6 receives the conversion command. In this case, after the falling edge of the SEN signal, at time E, a control signal which is set by S1 ("001" in FIG. 7) that is a selection signal of IC6 is outputted from the MPX 14 and 15. Likewise, at time E when the IC7 is selected, a control signal which is set by S2 that is a selection signal of IC7 is outputted from the MPX 34 and 35. At time F when the IC6 is selected again, the same process as mentioned above is carried out.

Thereafter, the control signals outputted from the switching circuits (MPX) 14 and 15 of the IC6 and the control signals outputted from the switching circuits (MPX) 34 and 35 of the IC7 are sampled and held by S/H circuits (sample hold means) 17 and 16 of the IC6 and S/H circuits (sample hold means) 30 and 31 of the IC7, respectively. The timing depends on sample hold pulses (SHP1 and SHP2), and the same sample hold signal is inputted to the IC6 and the IC7 after a predetermined period of time, on the basis of the A/D conversion command timing. Accordingly, even in an IC that is not selected, the sample and hold operation is carried out.

Next, the control signals which are sampled and held by the S/H circuits 17 and 16 of the IC6 or the S/H circuits 30 and 31 of the IC7 are maintained in the hold states from when they are sampled to when they are sampled again, like the IC conversion signal at time E with respect to the conversion command of the IC6 at time D, and the control signals are time-division-transferred from OUT1 or OUT2 of the selected analog signal processing IC to the A/D converter (A/D conversion means) 169 of the digital signal processing IC IC8.

In the digital signal processing IC IC8, switches ADSW1 and ADSW2 are placed just before the A/D converter 169, and the time-division-transferred control signals, which are in the hold states, of the selected analog signal processing IC are subjected to A/D conversion by switching between the ADSW1 and the ADSW2. To be specific, when the IC 6 is selected, the switch ADSW1 is operated while the switch ADSW2 is in the OFF state. When IC7 is selected, the switch ADSW2 is operated while the switch ADSW1 is in the OFF state.

Further, the gains of the control signals which are outputted from the switching circuits (MPX) 14 and 15 of the IC6 and the switching circuits (MPX) 34 and 35 of the IC7 can be changed by variable gain amplifiers (variable gain amplification means) 20 and 21 of the IC6 and variable gain amplifiers (variable gain amplification means) 32 and 33 of the IC7, respectively. The gain changes by the variable gain amplifiers 20, 21, 32, and 33 are set by the state-setting 16-bit serial transfer having the above-mentioned ICSEL bit and state-setting-register selection bit.

As described above, in the optical disk control device according to the third embodiment, a plurality of analog signal processing ICs, which are constituted in like manner as described for the second embodiment, are provided according to the kinds of optical disks to deal with, and the outputs from these ICs are selectively used in the digital signal processing IC. Therefore, the number of lines of the various output signals, which lines are required corresponding to the kinds of optical disks, is significantly reduced, resulting in an optical disk control device which can suppress an increase in the cost of the optical disk drive.

That is, under circumferences where one optical disk drive deals with plural kinds of disks and, therefore, the circuit components of the drive are increased like the recent optical disk drives, it is general that an IC adapted to an addition disk is added to an IC adapted to a fundamental disk. However, it is difficult to realize such IC structure adapted to plural disks because the number of connection lines considerably increases. In this third embodiment, it is possible to constitute a circuit structure which is superior to the conventional one in cost and reliability without increasing the number of connection lines between the ICs, thereby providing a digital-servo-mounted optical disk control device which is adaptable to plural kinds of disks.

While in this third embodiment each of the plural analog signal processing ICs has two outputs as in the second embodiment, the analog signal processing IC may have a single output as in the first embodiment if a little increase in the scale of the IC is allowed.

Further, while in the third embodiments one of the outputs from the two analog signal processing ICs is selected, one of three or more analog signal processing ICs may be selected.

Furthermore, while in the first to third embodiments of the invention control devices for controlling optical disk drives have been described, the present invention is applicable to any digital control device, such as those for hard disk drives, video equipment, and the like, as long as the control device requires plural pins for output.

While in the first to third embodiments of the invention digital control devices have been described, the present invention is applicable to any device as long as it has an analog signal processing unit and a digital signal processing unit, and plural analog signals are transferred from the analog signal processing unit to the digital signal processing unit.

What is claimed is:

1. An optical disk control device comprising a digital signal processing means and an analog signal processing means, said digital signal processing means comprising an A/D conversion command means for converting analog signals, and a serial transfer means, said analog signal processing means comprising:

a playback signal detection means for detecting data recorded on a disk;

a serial reception means for receiving a signal transferred from the serial transfer means on the basis of a conversion command from said A/D conversion command means of the digital signal processing means; and a signal switching means for successively selecting plural data signals obtained by the playback signal detection means, according to a signal received by the serial reception means, and for time-division-multiplexing the selected signals;

said digital signal processing means comprising:

an A/D conversion means for analog-to-digital conversion of a data signal transferred from the analog signal processing means; and an arithmetic processing means for performing arithmetic processing on digital signals outputted from the A/D conversion means;

said A/D conversion command means for first setting an order of acquiring digital signals outputted from the arithmetic process means, and then generating an A/D conversion command instructing performance of an A/D conversion according to said set order; and said serial transfer means for serially transferring a command signal from the A/D conversion command means.

2. The optical disk control device as defined in claim 1, wherein:

said serial transfer means controllable on the basis of the conversion command from the A/D conversion command means of the digital signal processing means; and said signal switching means operable by a signal from the serial reception means of the analog signal processing means to select one of plural data signals obtained by the playback signal detection means, for each conversion command, and for time-division-multiplexing and transferring the selected signals to the A/D conversion means of the digital signal processing means.

3. The optical disk control device as defined in claim 1, wherein the arithmetic means for performing arithmetic processing performs such processing on digital signals outputted from the A/D conversion means successively in a predetermined order, to generate a control signal for controlling an optical system.

4. An optical disk control device comprising a digital signal processing means and an analog signal processing means, said digital signal processing means comprising an A/D conversion command means for converting analog signals, and a serial transfer means, a plurality of said analog signal processing means, said analog signal processing means comprising:

a playback signal detection means for detecting data recorded on a disk;

a serial reception means for receiving a signal transferred from the serial transfer means on the basis of a conversion command from said A/D conversion command means of the digital signal processing means; and a signal switching means for successively selecting plural data signals obtained by the playback signal detection means, according to a signal received by the serial reception means, and for time-division-multiplexing the selected signals;

said digital signal processing means comprising:

an A/D conversion means for analog-to-digital converting a data signal transferred from the analog signal processing means, said A/D conversion means for successively selecting output signals from the signal switching means of the plural analog signal processing means on the basis of a command from the A/D conversion command means of the digital signal processing means, and for successively converting the selected output signals into digital signals; and an arithmetic processing means for performing arithmetic processing on the basis of a digital signal outputted from the A/D conversion means;

said A/D conversion command means for generating an A/D conversion command under an instruction from the arithmetic processing means; and said serial transfer means for serially transferring a command signal from the A/D conversion command means.

5. An optical disk control device comprising a digital signal processing means and an analog signal processing means, said digital signal processing means comprising an A/D conversion command means for converting analog signals, and a serial transfer means, said analog signal processing means comprising:
a playback signal detection means for detecting data recorded on a disk;
a serial reception means for receiving a signal transferred from the serial transfer means on the basis of a conversion command from said A/D conversion command means of the digital signal processing means;
a signal switching means for successively selecting plural data signals obtained by the playback signal detection means, according to a signal received by the serial reception means, and for time-division-multiplexing the selected signals; and
a sample hold means for sampling and holding an output signal from the signal switching means, on the basis of a signal transferred from the serial transfer means;

said digital signal processing means comprising:
an A/D conversion means for analog-to-digital converting a data signal transferred from the analog signal processing means, said A/D conversion means is for converting an analog signal which is sampled and held by the sample hold means, into a digital signal; and
an arithmetic processing means for performing arithmetic processing on the basis of a digital signal outputted from the A/D conversion means;

said A/D conversion command means for generating an A/D conversion command under an instruction from the arithmetic processing means; and said serial transfer means for serially transferring a command signal from the A/D conversion command means.

6. The optical disk control device as defined in claim 5, wherein
said analog signal processing means comprising a pair of the signal switching means and a pair of the sample hold means; and
said A/D conversion means is for converting analog signals which are sampled and held by the pair of the signal switching means and the pair of the sample hold means, into digital signals.

7. An optical disk control device comprising a digital signal processing means and an analog signal processing means, said digital signal processing means comprising an A/D conversion command means for converting analog signals and a serial transfer means, said analog signal processing means comprising:
a playback signal detection means for detecting data recorded on a disk;
a serial reception means for receiving a signal transferred from the serial transfer means on the basis of a conversion command from said A/D conversion command means of the digital signal processing means;
a variable gain amplification means controllable by a state setting communication from the serial reception means for setting the internal state of the analog signal processing means;
a signal switching means for successively selecting plural data signals obtained by the playback signal detection means, according to a signal received by the serial reception means, and for time-division-multiplexing the selected signals, said signal switching means operable by a signal from the serial reception means to select one of plural data signals obtained by the playback signal detection means, for each conversion command; and
the gain of the variable gain amplification means is setting by the state setting signal, which is transferred for each conversion command by the state setting communication, for setting the internal state of the analog signal processing means;

said digital signal processing means comprising:
an AID conversion means for analog-to-digital converting a data signal transferred from the analog signal processing means; and
an arithmetic processing means for performing arithmetic processing on the basis of a digital signal outputted from the A/D conversion means;

said A/D conversion command means for generating an A/D conversion command under an instruction from the arithmetic processing means; and said serial transfer means for serially transferring a command signal from the A/D conversion command means.

8. The optical disk control device as defined in claim 7, wherein
said analog signal processing means comprises a pair of sample hold means for sampling and holding output signals from the signal switching means on the basis of a signal transferred from the serial transfer means, and a pair of the variable gain amplification means; and
the gains of the variable gain amplification means are set by a state setting signal that is transferred for a pair of signals for each conversion command, and the pair of the sample hold means for simultaneously obtaining output signals from the signal switching means.

9. The optical disk control device as defined in claim 7, comprising:
a plurality of the analog signal processing means, each of the plural analog signal processing means comprising a pair of the sample hold means and a pair of the variable gain amplification means.

* * * * *